US012105982B1

(12) United States Patent
Subramanian et al.

(10) Patent No.: US 12,105,982 B1
(45) Date of Patent: Oct. 1, 2024

(54) TECHNIQUES FOR OPTIMIZED DATA RESYNCHRONIZATION BETWEEN REPLICATION SITES

(71) Applicant: Dell Products L.P., Hopkinton, MA (US)

(72) Inventors: Vasudevan Subramanian, Chapel Hill, NC (US); Michael C. Brundage, Cary, NC (US); Alan L. Taylor, Cary, NC (US); Nagapraveen Veeravenkata Seela, Cary, NC (US)

(73) Assignee: Dell Products L.P., Hopkinton, MA (US)

( * ) Notice: Subject to any disclaimer, the term of this patent is extended or adjusted under 35 U.S.C. 154(b) by 20 days.

(21) Appl. No.: 18/122,978

(22) Filed: Mar. 17, 2023

(51) Int. Cl.
*G06F 12/00* (2006.01)
*G06F 3/06* (2006.01)
*G06F 16/27* (2019.01)

(52) U.S. Cl.
CPC ............ *G06F 3/065* (2013.01); *G06F 3/0653* (2013.01); *G06F 3/0655* (2013.01); *G06F 3/0679* (2013.01); *G06F 16/275* (2019.01)

(58) Field of Classification Search
CPC ...... G06F 3/065; G06F 3/0653; G06F 3/0655; G06F 3/0679; G06F 16/275
See application file for complete search history.

(56) References Cited

U.S. PATENT DOCUMENTS

| 6,907,507 | B1 * | 6/2005 | Kiselev | G06F 11/1458 |
| | | | | 714/E11.12 |
| 7,149,858 | B1 * | 12/2006 | Kiselev | H04L 67/565 |
| | | | | 711/163 |
| 11,513,684 | B1 * | 11/2022 | Tylik | G06F 3/0644 |
| 2019/0354708 | A1 * | 11/2019 | Fisher | G06F 16/212 |
| 2020/0026616 | A1 * | 1/2020 | Chen et al. | G06F 11/1469 |
| 2022/0342551 | A1 * | 10/2022 | Bora | G06F 11/1435 |
| 2022/0374316 | A1 * | 11/2022 | Kumar et al. | G06F 11/1451 |

OTHER PUBLICATIONS

U.S. Appl. No. 18/164,382, filed Feb. 3, 2023, entitled Storage Resource Resynchronization Using Pending IO Requests, to Vasudevan Subramanian, et al.

\* cited by examiner

*Primary Examiner* — Shawn X Gu
*Assistant Examiner* — Mohammad S Hasan
(74) *Attorney, Agent, or Firm* — Muirhead and Saturnelli, LLC

(57) ABSTRACT

Techniques for resynchronizing storage resources of two sites configured for synchronous replication can include tracking in-progress write requests in a map. Responsive to a site failure or a replication link failure resulting in failure or fracture of the synchronous replication, processing can be performed to resynchronize impacted resources of the two sites configured for synchronous replication. The processing can use the in-progress write requests in combination with resource snapshots and snapshot differences to resynchronize the impacted resource of the two sites. In at least one embodiment, the synchronous replication configuration can include active paths between both sites and a host. In at least one embodiment, the synchronous replication configuration can include an active path between the host and one site, and a passive path between the host and the second site. The synchronous replication can be bi-directional or two-way synchronous replication between the two sites.

20 Claims, 11 Drawing Sheets

250

252 — The metro preferred or sync active site A receives a write I/O operation or request W1 directed to stretched LUN A from a host. The write request W1 can be directly received by site A from the host. Alternatively in a metro configuration, the write request W1 can be initially received by the non-preferred site B and then forwarded to site A for servicing. The stretched LUN A can be configured from local volume or resource V1 of site A and local volume resource V2 of site B, where V1 and V2 are both configured to have the same identity of "LUN A". From the perspective of the host, the host views both V1 and V2 as the same logical device, volume or LUN with identity "LUN A".

254 — Site A can commit the write request W1 locally to V1, record an entry E1 for an in-progress write request in the in-progress map for the write request W1, and then send a remote write request R1 to site B. The remote write request R1 can correspond to the received write W1 from the host and can request that site B also commit or perform the write W1 with respect to its local resource V2.

256 — Site B can receive the remote write request R1 and perform processing to commit the write request W1 to its local volume or resource V2. Once the remote write request R1 is committed on site B, the site B can return an acknowledgement for the remote write request R1 to site A.

258 — Site A can receive the acknowledgement from site B. Responsive to receiving the acknowledgement, site B can delete or remove from the in-progress map a corresponding entry E1 for the in-progress write request corresponding to the host write request W1.

260 — An acknowledgement regarding completion of W1 can be returned to the host that originated W1. Generally, the particular one of the sites A or B which initially received the write directly from the host can return the acknowledgment to the host. Thus, as a first case, if W1 was received directly at site A from the host and not indirectly through site B, the acknowledgement can be returned directly from site A to the host. Alternatively, as a second case, if W1 was received initially at site B and then forwarded to site A, site A can return a response or acknowledgement to site B that the write W1 is complete. Subsequently, site B can return a response or acknowledgement regarding completion of W1 to the host that originated the write request W1.

FIG. 6B

TECHNIQUES FOR OPTIMIZED DATA RESYNCHRONIZATION BETWEEN REPLICATION SITES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise:

establishing a synchronous replication configuration for a first stretched resource that has a first identity, wherein the first stretched resource is configured from a first resource on a first storage system and a second resource on a second storage system, wherein the first resource and the second resource are both configured to have a same identity, the first identity, wherein the first resource is exposed to the host over a first path between the first storage system and the host, wherein the second resource is exposed to the host over a second path between the second storage system and the host, wherein the host identifies the first path and the second path as two paths to a same stretched resource, the first stretched resource; tracking, by the first storage system, a plurality of in-progress write requests in a map, wherein the map includes a corresponding entry for each of the plurality of in-progress write requests which has been committed by the first storage system and where the first storage system has not yet received an acknowledgement from the second storage system regarding commitment of said each in-progress write request; determining a failure of the first storage system thereby failing or fracturing the established synchronous replication configuration for the first stretched resource; responsive to said determining the failure of the first storage system, performing first processing including taking a snapshot B1 of the second resource of the second storage system; responsive to the first storage system recovering from the failure, performing second processing including: taking a snapshot A1 of the first resource of the first storage system; the second storage system retrieving the map from the first storage system; for each in-progress write request of the map directed to the first stretched resource, the second storage system marking blocks specified by said each in-progress write request as modified on the second resource; taking a snapshot B2 of the second resource of the second storage system; computing a first snapshot difference between the snapshot B1 and the snapshot B2, wherein the first snapshot difference identifies a first list of blocks of the second resource marked as modified; and storing content of modified blocks of the first list at corresponding blocks of the snapshot A1 of the first resource of the first storage system.

In at least one embodiment, processing can include: the first storage system tracking in-progress write requests for first write requests that are directed to the first stretched resource and received at the first storage system; and the first storage system tracking second write requests that are directed to the first stretched resource and received at the second storage system. Servicing each of the second write requests received by the second storage system can include: forwarding said each second write request to the first storage system; the first storage system committing said each second write request; the first storage system creating an entry in the map identifying said each second write request as an in-progress write request; for said each second write request, sending a corresponding remote write request from the first storage system to the second storage system requesting that the second storage system commit said each second write request; the second storage system receiving the corresponding remote write request and committing said each second write request; the second storage system returning an acknowledgement to the first storage system regarding commitment of the said each second write request by the second storage system; in response to the first storage system receiving the acknowledgement, the first storage system deleting a corresponding entry from the map for said each second write request, and the first storage system sending a second acknowledgement to the second storage system regarding completion of said each second write request; and in response to the second storage system receiving the second acknowledgement, the second storage system returning a third acknowledgement to the host which sent said each second write request to the second storage system.

In at least one embodiment, the first processing can be performed while the first storage system is offline, down or unavailable prior to the first storage system recovering from the failure, and wherein said first processing can include the second storage system receiving and servicing a second plurality of write requests that are received from the host and that are directed to the stretched resource, wherein said servicing the second plurality of write requests includes the second storage system applying the second plurality of write requests to the second resource of the second storage system.

Processing can include, for each in-progress write request of the map directed to the first stretched resource, the second storage system issuing a data-less write request to mark blocks of said each in-progress write request as modified on the second resource without writing any content to the second resource of the second storage system. Each entry of the map can include a data structure comprising one or more fields identifying a target location on the second resource, wherein the target location can include one or more blocks. The data structure can identify the target location using a plurality of fields including a first field identifying a storage resource identifier denoting the second resource, a starting offset on the second resource, and a length denoting a size of the target location. The first storage resource and the second resource can both be a first resource type that is one of a plurality of resource types. The plurality of resource types can include: a volume, a logical device, a logical unit (LUN), a virtual volume (vvol), and a file system.

In at least one embodiment, computer-readable media can include code stored thereon that, when executed, performs another method. A system can include one or more processors and a memory with code stored thereon that, when executed also performs the method. The method can include: establishing a synchronous replication configuration for a first stretched resource that has a first identity, wherein the first stretched resource is configured from a first resource on a first storage system and a second resource on a second storage system, wherein the first resource and the second resource are both configured to have a same identity, the first identity, wherein the first resource is exposed to the host over a first path between the first storage system and the host, wherein the second resource is exposed to the host over a second path between the second storage system and the host, wherein the host identifies the first path and the second path as two paths to a same stretched resource, the first stretched resource; tracking, by the first storage system, a plurality of in-progress write requests in a map, wherein the map includes a corresponding entry for each of the plurality of in-progress write requests which has been committed by the first storage system and where the first storage system has not yet received an acknowledgement from the second storage system regarding commitment of said each in-progress write request; determining a failure of the second storage system thereby failing or fracturing the established synchronous replication configuration for the first stretched resource; responsive to said determining the failure of the second storage system, performing first processing including: the first storage system quiescing I/O activity directed to the stretched resource; taking a snapshot A1 of the first resource of the first storage system; the first storage system unquiescing I/O activity directed to the stretched resource; and for each in-progress write request of the map directed to the first stretched resource, the first storage system marking blocks specified by said each in-progress write request as modified on the snapshot A1 of first resource; responsive to determining that the second storage system has recovered from the failure, performing second processing including: taking a snapshot B1 of the second resource of the second storage system; taking a snapshot A2 of the first resource of the first storage system; computing a first snapshot difference between the snapshot A1 and the snapshot A2, wherein the first snapshot difference identifies a first list of blocks of the first resource marked as modified; and storing content of modified blocks of the first list at corresponding blocks of the snapshot B1 of the second resource of the first storage system.

In at least one embodiment, quiescing I/O activity can include pausing incoming requests directed to the stretched resource and freezing acknowledgements from the first storage system to the host regarding I/Os directed to the stretched resource. Quiescing I/O activity can include freezing acknowledgements from the first storage system to the host regarding pending I/O requests that have corresponding in-progress write requests in the map. For each in-progress write request of the map directed to the first stretched resource, the first storage system can issue a data-less write request to mark blocks of said each in-progress write request as modified on the snapshot A1 of the first resource without writing any content to the second resource of the second storage system. Unquiescing I/O activity can include resuming processing of incoming requests directed to the stretched resource and resuming sending acknowledgements from the first storage system to the host regarding I/Os directed to the stretched resource. Unquiescing I/O activity can include resuming sending acknowledgements from the first storage system to the host regarding pending I/O requests that have corresponding in-progress write requests in the map.

In at least one embodiment, the first storage resource and the second resource can both be a first resource type which is one of a plurality of resource types, and wherein the plurality of resource types can include: a volume, a logical device, a logical unit (LUN), a virtual volume (vvol), and a file system. The first processing can include: the first storage system receiving, from the host, a first plurality of write requests directed to the stretched resource; and the first storage system servicing the first plurality of write requests using the first resource of the first storage system. The synchronous replication configuration can be a two-way or bidirectional synchronous replication configuration where writes directed to the stretched resource are received at the first storage system, applied to the first resource, and synchronously replicated from the first storage system to the second storage system; and where writes directed to the stretched resource are received at the second storage system, forwarded to the first storage system, applied to the first resource, and synchronously replicated from the first storage system to the second storage system.

In at least one embodiment, computer-readable media can include code stored thereon that, when executed, performs another method. A system can include one or more processors and a memory with code stored thereon that, when executed also performs the method. The method can include: establishing a synchronous replication configuration for a first stretched resource that has a first identity, wherein the first stretched resource is configured from a first resource on a first storage system and a second resource on a second storage system, wherein the first resource and the second resource are both configured to have a same identity, the first identity, wherein the first resource is exposed to the host over a first path between the first storage system and the host, wherein the second resource is exposed to the host over a second path between the second storage system and the host, wherein the host identifies the first path and the second path as two paths to a same stretched resource, the first stretched resource; tracking, by the first storage system, a plurality of in-progress write requests in a map, wherein the map includes a corresponding entry for each of the plurality of in-progress write requests which has been committed by the first storage system and where the first storage system has not yet received an acknowledgement from the second storage system regarding commitment of said each in-progress write request; determining a failure of the first storage system thereby failing or fracturing the established synchronous replication configuration for the first stretched resource, wherein the second storage system does not service requests directed to the first stretched resource responsive said failure of the first storage system thereby causing a disruption in service and data unavailability of the first stretched resource; responsive to the first storage system recovering from the failure, performing first processing including: taking a snapshot A1 of the first resource of the first storage system; for each in-progress write request of the map directed to the first stretched resource, the first storage system marking blocks specified by said each in-progress write request as modified on the snapshot A1 of first resource; taking a snapshot B1 of the second resource of the second storage system; after taking the snapshot B1, the first storage system receiving a first plurality of writes directed to the stretched resource and applying the first plurality of writes to the first resource; after applying the first plurality of writes to the first resource, taking a snapshot A2 of the first resource of the first storage system; computing a first snapshot difference between the snapshot A1 and the snapshot A2, wherein the first snapshot difference identifies a first list of blocks of the first resource marked as modified; and storing content of modified blocks of the first list at corresponding blocks of the snapshot B1 of the second resource of the first storage system.

In at least one embodiment, processing can include, for each in-progress write request of the map directed to the first stretched resource, the first storage system issuing a dataless write request to mark blocks of said each in-progress write request as modified on the snapshot A1 of the first resource without writing any content to the second resource of the second storage system. The first storage resource and the second resource can both be a first resource type, and wherein the first resource type can be one of a plurality of resource types including a volume, a logical device, a logical unit (LUN), a virtual volume (vvol), and a file system.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 6B, 7, 8 and 9 are flowcharts of processing steps that can be performed in at least one embodiment in accordance with the techniques of the present disclosure.

DETAILED DESCRIPTION OF EMBODIMENT(S)

Figure 1:
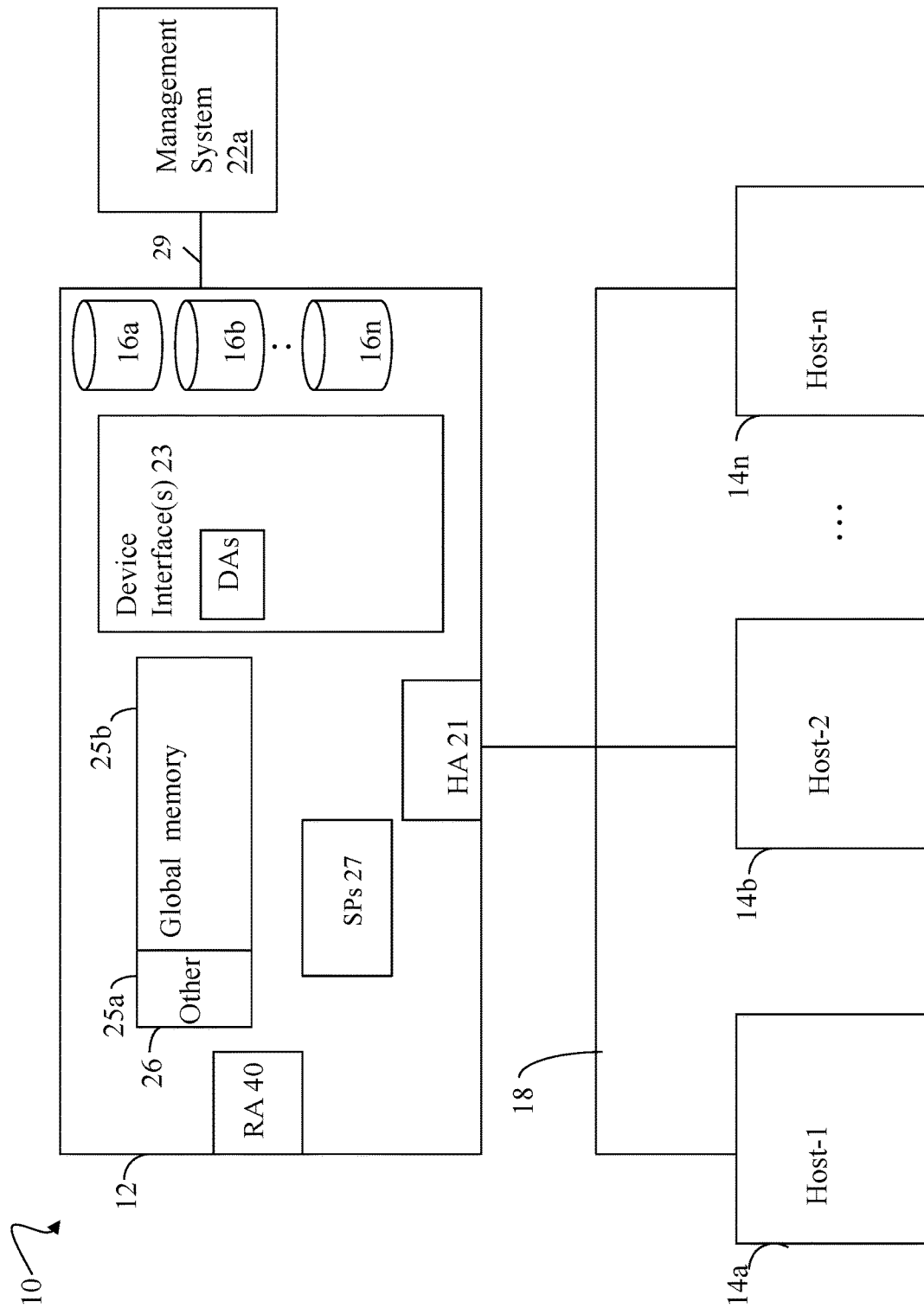
FIG. 1 is an example of components that can be included in a system in accordance with the techniques of the present disclosure.

Two data storage systems, sites or data centers, such as "site or system A" and "site or system B", can present a single data storage resource or object, such as a volume or logical device, to a client, such as a host. The volume can be configured as a stretched volume or resource where a first volume V1 on site A and a second volume on site B are both configured to have the same identity from the perspective of the external host. The stretched volume can be exposed over paths going to both sites A and B. In a one-way synchronous replication configuration, the host can issue I/Os to the stretched volume over paths to only site A (but not site B), where the writes sent to site A are applied to V1, and where such writes can then be automatically synchronously replicated to the site B and applied to V2. In a metro replication configuration, the host can issue writes to the stretched volume over paths to both site A and site B, where writes to the stretched volume on each of the sites A and B are automatically synchronously replicated to the other peer site. In this manner with the metro replication configuration, the two data storage systems or sites can be configured for two-way or bi-directional synchronous replication for the configured stretched volume.

The stretched volume can provide data protection due to the synchronous mirroring of data maintained on V1 of site A and V2 of site B. For example, if site A experiences a disaster or is otherwise unavailable, the V2 copy of the stretched volume on site B can be used by the storage clients rather than have the storage clients undesirably experience data unavailability of the stretched volume. Alternatively, if site B experiences a disaster or is otherwise unavailable, the copy of the stretched volume V1 on site A can be used by the storage clients rather than have the storage clients undesirably experience data unavailability of the stretched volume. Thus, the various resources, including computing, networking and storage resources, on the two sites A and B can provide the needed redundancy for a user's application, such as an application executing on a host which reads data from and/writes data to the stretched volume.

Another resource used in the replication of data of the stretched volume includes a link between the two sites A and B, where the link can be used as a replication link to replicate data of the stretched volume between the two sites A and B. The link used for replication can be a network link which is private network link or a leased network link controlled by a third party network provider. In some cases, the network link can be point to point. In other cases, the network link may not be point to point and can include various components such as switches, networks and edge devices which might not provide redundancy. During steady state, the stretched volumes are protected with the one-way synchronous replication or metro replication between sites A and B. If there is a disaster on either site A or B, the storage clients can have continued access and availability to data of the stretched volume on the remaining healthy site.

Generally, failures in connection with the synchronous replication or metro replication of the stretched volume can be partitioned into the following 3 major classes: loss of the storage system at Site A, loss of the storage system at Site B, and loss of the network link used for replication between sites A and B. After any of the above failures resulting in replication failure, the data or content of the stretched volume on sites A and B will not be synchronized. Put another way, the content of V1 of site A will not be synchronized or match the content of V2 of site B, where V1 and V2 are configured as the stretched volume. To illustrate, responsive to a failure of the bi-directional or two-way replication in the metro replication configuration, storage clients can continue to run using a single copy of the stretched volume on a single one of the sites, such as site A, where the other remaining site, such as site B has stale data when it becomes available or re-connects with the other site A. Once either the lost replication link between sites is restored or the remaining site B comes back online, a resynchronization process can be used to resynchronize V2 of site B with V1 of site A. Note that in the case where the replication failure is due to a failed network link going down between the two sites, one of the sites can become unavailable to avoid serving stale data such that only a single one of the sites, such as site A noted above, continues to service storage clients using its local copy V1 of the stretched volume.

One existing resynchronization technique uses recovery snapshots or snaps on sites A and B. A snapshot or snap of a storage object or resource generally refers to a point-in-time (PIT) replication of data of a storage resource (e.g., a LUN or volume, a file system), along with its associated snapshot metadata. Such a snapshot can be a full replica (or copy) of the data stored on the storage resource, a partial copy of the data stored on the storage resource, or a space-efficient copy that includes differences between a current version of the data stored on the storage resource at one PIT and an earlier version of the data stored on the storage resource at a prior PIT. One conventional technique can include creating recovery snapshots periodically, e.g., every 30 minutes, in a coordinated manner on the two sites A and B. The recovery snapshots are leveraged to determine the write requests that might not have been replicated at the time of any fault in the sites A and B, or in the network link therebetween. For example, assuming site B was unavailable and site A continued to service storage clients using its copy V1 of the stretched volume, a snapshot difference between two successive snapshots of the stretched volume of site A can be used to synchronize the missing writes on site B which was unavailable or offline due to a fault causing the replication failure.

Use of recovery snapshots with the above-noted conventional technique has disadvantages. One disadvantage is that the recovery snapshots are taken periodically such as every 30 minutes on a continuous basis. In this case, the periodicity at which recovery snapshots are taken indicates that resynchronization of 30 minutes of writes may be needed and transferred between sites, such as from V1 of site A to V2 site B, to bring V2 of site B up to date. Additionally, the creation and deletion of recovery snapshots in an ongoing periodic basis incurs costs which can adversely impact system performance and latency.

Described in the following paragraphs are techniques of the present disclosure which overcome the foregoing disadvantages and can reduce the amount of time and resources needed for a data transfer in connection with resynchronization of data of a stretched volume or other resource between the sites A and B. The resynchronization can be performed upon recovery from a failure or fracture of an established synchronous replication configuration between stretched resources of site A and site B. Additionally, the techniques of the present disclosure avoid use of recovery snapshots which are created and deleted periodically in an ongoing continuous manner.

In at least one embodiment, the techniques of the present disclosure persistently track in-progress or pending writes directed to a stretched volume or resource. In at least one embodiment, only a designated one of the sites with respect to the stretched volume persistently tracks the in-progress or pending writes. In at least one embodiment using a metro replication configuration, the designated site which persistently stores in-progress writes can be a designated preferred site. The preferred site, rather than the non-preferred site, can be preferred by a host or other external storage client for sending I/Os to the stretched volume. In at least one embodiment using a one-way synchronous replication (sometimes referred to as sync replication), the designated site which persistently stores in-progress writes can be the active site with the non-designated site being the passive site.

In at least one embodiment with a metro replication configuration or a one-way synchronous replication configuration, all writes can always be initially committed to a designated one of the two sites. For example in the metro replication configuration in at least one embodiment where site A is the preferred site for a stretched volume, writes which are directed to the stretched volume and received at both sites A and B are all first committed on the preferred site A and then committed on the non-preferred site B. Thus, writes directed to the stretched volume received at the non-preferred site B are first forwarded to the preferred site A for commitment, and then sent from site A to site B for commitment. Responsive to a fault resulting in replication failure, a first of the two sites A and B can remain and continue to service storage clients using its local copy of the stretched volume or resource. Additionally, a snapshot of the stretched volume or resource at the first site can be taken. Subsequently, when the second remaining site comes online and re-establishes communication with the first site, resynchronization processing can be efficiently performed using the persisted in-progress writes and the snapshot.

The techniques of the present disclosure enhance and improve resynchronization in response to a failure or fracturing of an established synchronous replication relationship or configuration between sites for stretched storage resources or objects. The failure or fracturing of the established replication relationship or configuration can be the result of a failure of site A, a failure of site B, and/or a failure of the networking or replication link between sites A and B. In particular, as discussed in more detail below, the techniques of the present disclosure reduce the amount of data transfer and the amount of time associated with resynchronizing sites A and B after recovery from the synchronous replication failure. Additionally, the techniques of the present disclosure can utilize snapshots of resources. However, such snapshots are not taken on a periodic ongoing basis which can be both resource consuming and time consuming. Rather, the techniques of the present disclosure provide for taking and utilizing snapshots of resources once a first failed, unavailable or disconnected site recovers and is in communication with the second site.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page. Further details regarding a mapping layer that can be maintained by the data storage system and used in at least one embodiment is described in more detail elsewhere herein such as in connection with FIG. 2B.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2A:
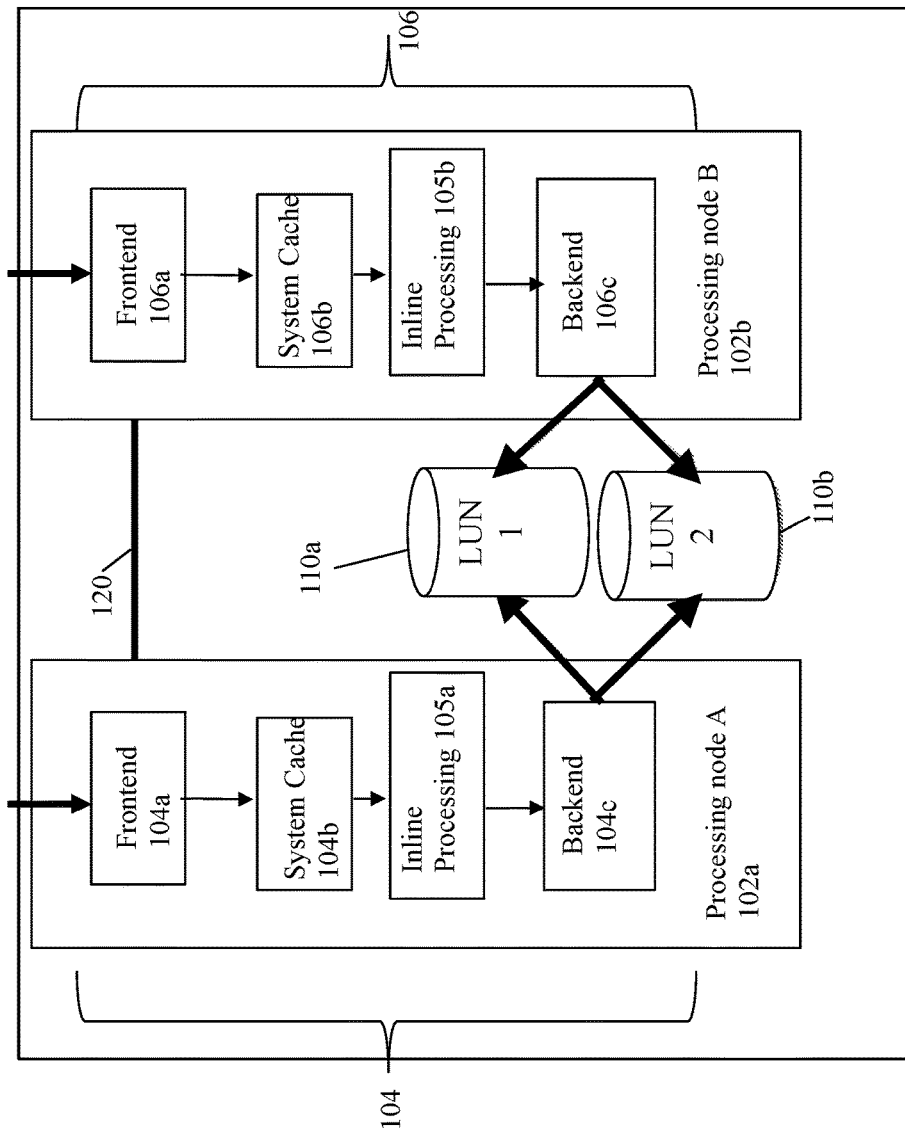
FIG. 2A is an example illustrating the I/O path or data path in connection with processing data in an embodiment in accordance with the techniques of the present disclosure.

With reference to the FIG. 2A, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Figure 2B:
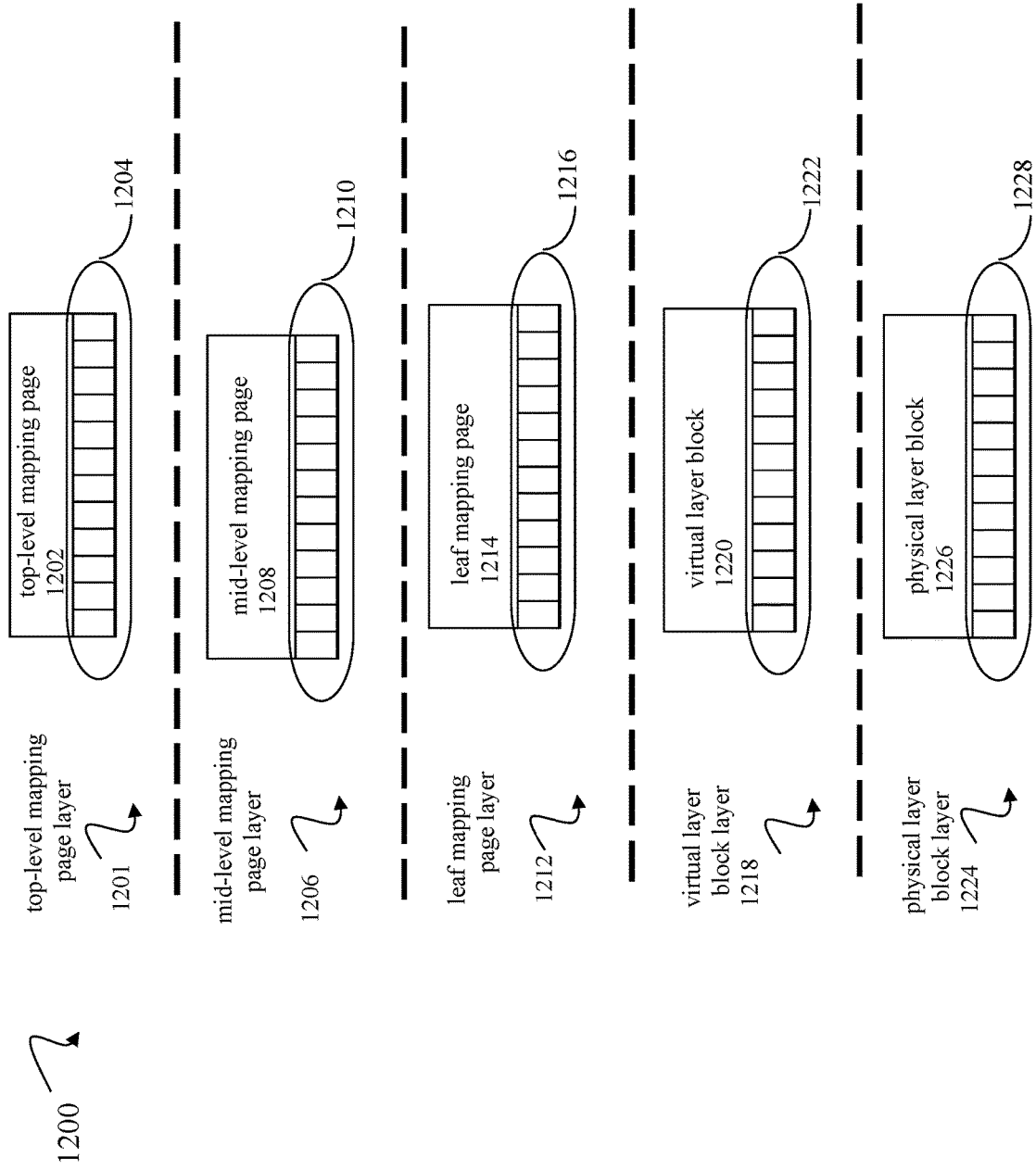
FIG. 2B is an example illustrating a mapper layer that can be maintained by the data storage system and used to map logical addresses to corresponding physical addresses in at least one embodiment in accordance with the techniques of the present disclosure.

Referring to FIG. 2B, shown is example of a mapper layer in at least one embodiment in accordance with the techniques of the present disclosure. Consistent with discussion elsewhere herein, a data storage system can generally include a mapper layer (e.g., mapper layer 1200) that is structured as a file system with various layers of pages and blocks. In some implementations, the combination of various mapper layers may be referred to as a mapper metadata tree. While the following example includes metadata "blocks", it will be appreciated that other units of data storage may be used within the scope of the present disclosure. In some implementations, a top-level mapping page layer (e.g., top-level mapping page layer 1202) may include top-level mapping page pages (e.g., top-level mapping page 1201) with a plurality of entries (e.g., plurality of entries 1204) that map or point to a plurality of entries of one or more mid-level mapping pages. A mid-level mapping page layer (e.g., mid-level mapping page layer 1206) may include mid-level mapping page pages (e.g., mid-level mapping page 1208) with a plurality of entries (e.g., plurality of entries 1210) that map or point to a plurality of entries of one or more leaf mapping pages. A leaf mapping page layer (e.g., leaf mapping page layer 1212) may include leaf mapping page pages (e.g., leaf mapping page 1214) with a plurality of entries (e.g., plurality of entries 1216) that map or point to a plurality of entries of one or more virtual layer blocks. Leaf mapping page layer 1212 may represent various ranges of LBAs of logical addresses. For example, each entry of the plurality of entries (e.g., plurality of entries 1216) of the leaf mapping page (e.g., leaf mapping page 1214) may be associated with a LBA range. In some implementations, the combination of top-level mapping page layer 1202, mid-level mapping page layer 1206, and leaf mapping page layer 1212 may be organized in a "tree" data structure where each leaf mapping page is a "leaf" of the "tree" data structure that corresponds to a specific LBA range. Accordingly, each leaf mapping page (e.g., leaf mapping page 1214) may hold mapping of a LBA to a virtual layer block. It will be appreciated that other data structures may be used within the scope of the present disclosure to organize the first layer.

In some implementations, a virtual layer block layer (e.g., second layer 1218) may include virtual layer blocks (e.g., virtual layer block 1220) with a plurality of entries (e.g., plurality of entries 1222) that map to a plurality of entries of one or more physical data blocks. The virtual layer block layer (e.g., virtual layer block layer 1218) may generally isolate the logical address of a block from the physical location of the block. For example, a virtual layer block (e.g., virtual layer block 1220) may encapsulate the physical location of user data and allow relocation without updating leaf mapping pages (e.g., leaf mapping page 1214). Accordingly, the virtual layer block layer (e.g., virtual layer block layer 1218) may decouple the Logical Block Address space address from the physical one.

In some implementations, a physical data block layer (e.g., physical data block layer 1224) may include physical data blocks (e.g., physical data block 1226) with a plurality of entries or portions (e.g., plurality of entries 1228) that are configured to store user data. In this manner, physical data block layer 1224 may describe the physical location of user data in a storage system. In some implementations, each physical data block (e.g., physical data block 1226) may have a predefined amount of storage capacity for storing data (e.g., user data).

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as a synchronous mode described elsewhere herein.

Figure 3:
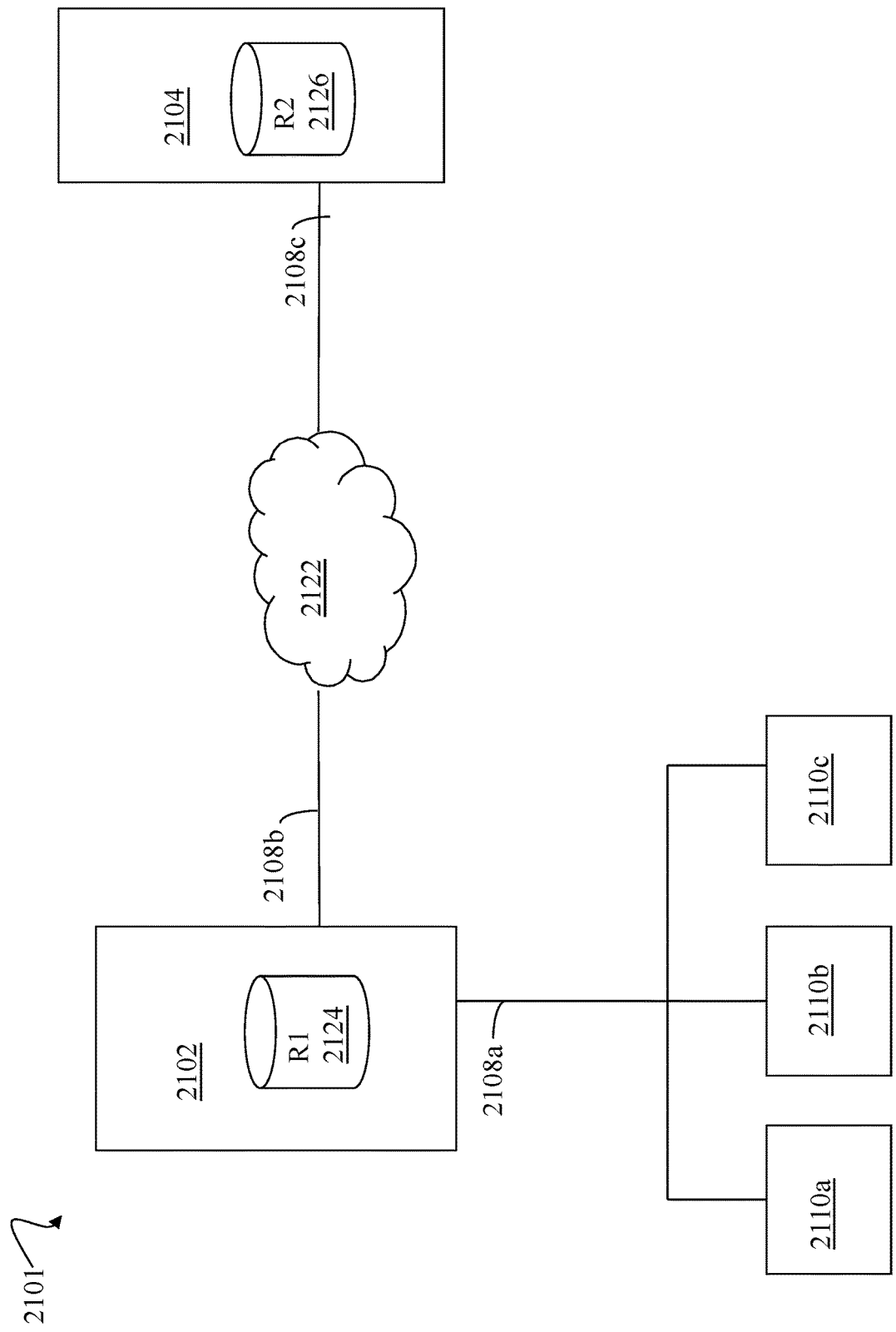
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can issue I/Os and other operations, commands, or requests to the data storage system 2102 over the connection 2108a. The hosts 2110a, 2110b and 2110c can be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 104 can be characterized as remote with respect to the hosts 2110a, 2110b and 2110c. The R1 and R2 devices can be configured as LUNs.

The host 1210a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With synchronous mode remote data replication in at least one embodiment, a host 2110a can issue a write to the R1 device 2124. The primary or R1 data storage system 2102 can store the write data in its cache at a cache location and mark the cache location as including write pending (WP) data as mentioned elsewhere herein. At a later point in time, the write data is destaged from the cache of the R1 system 2102 to physical storage provisioned for the R1 device 2124 configured as the LUN A. Additionally, the RRF operating in the synchronous mode can propagate the write data across an established connection or link (more generally referred to as a the remote replication link or link) such as over 2108b, 2122, and 2108c, to the secondary or R2 data storage system 2104 where the write data is stored in the cache of the system 2104 at a cache location that is marked as WP. Subsequently, the write data is destaged from the cache of the R2 system 2104 to physical storage provisioned for the R2 device 2126 configured as the LUN A. Once the write data is stored in the cache of the system 2104 as described, the R2 data storage system 2104 can return an acknowledgement to the R1 data storage system 2102 that it has received the write data. Responsive to receiving this acknowledgement from the R2 data storage system 2104, the R1 data storage system 2102 can return an acknowledgement to the host 2110a that the write has been received and completed. Thus, generally, R1 device 2124 and R2 device 2126 can be logical devices, such as LUNs, configured as synchronized data mirrors of one another. R1 and R2 devices can be, for example, fully provisioned LUNs, such as thick LUNs, or can be LUNs that are thin or virtually provisioned logical devices.

Figure 4:
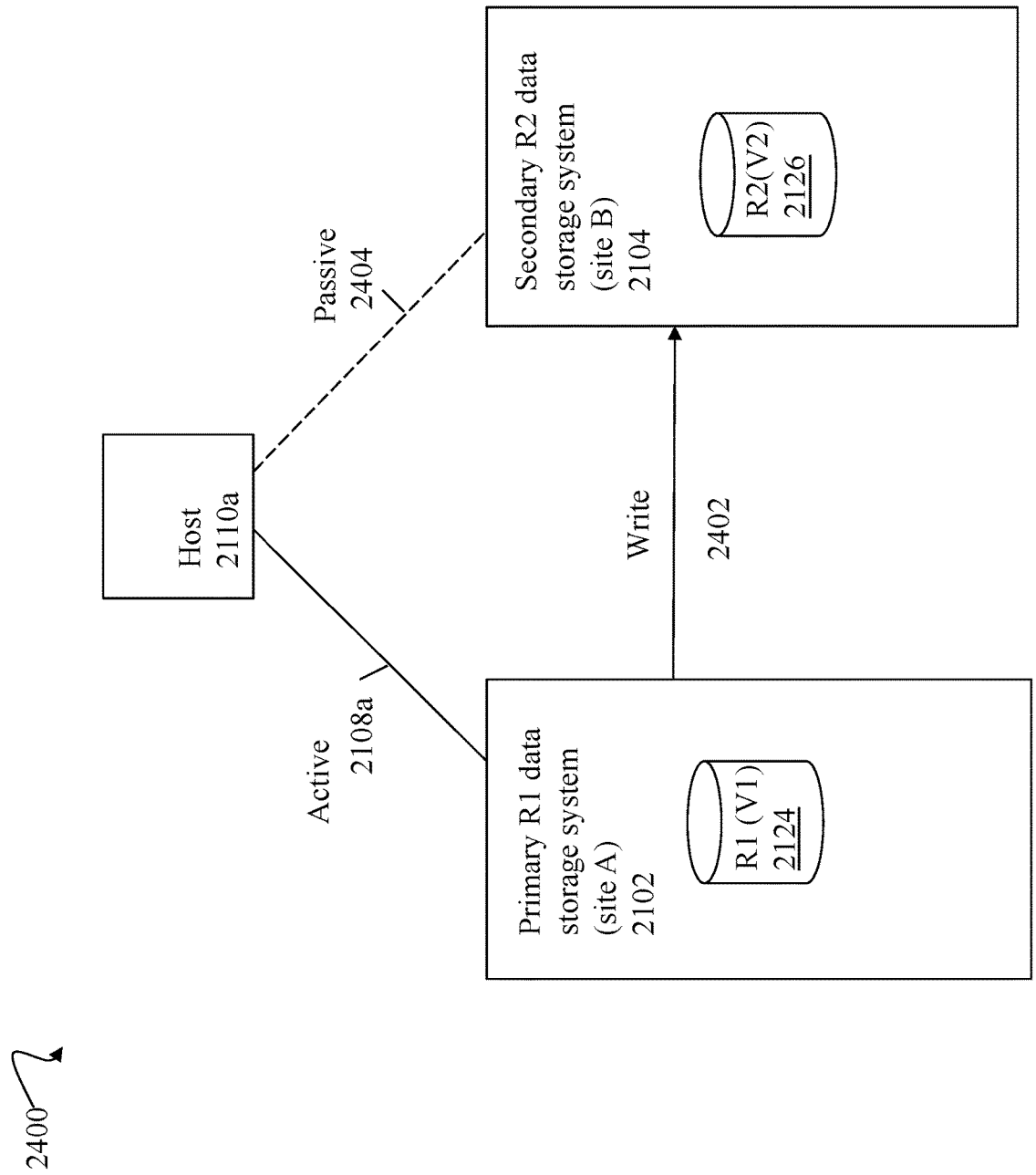
FIG. 4 is an example illustrating an active-passive replication configuration of a stretched volume using one-way synchronous replication in at least one embodiment in accordance with the techniques of the present disclosure.

With reference to FIG. 4, shown is a further simplified illustration of components that can be used in in connection with remote replication. The example 2400 is simplified illustration of components as described in connection with FIG. 2A. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 can also be referred to herein as an active-passive configuration with synchronous replication performed from the R1 data storage system 2102 to the secondary R2 system 2104. With the active-passive configuration of FIG. 4, the host 2110a has an active connection or path 2108a over which all I/Os are issued to only the R1 data storage system. The host 2110a can have a passive connection or path 2404 to the R2 data storage system 2104. Writes issued over path 2108a to the R1 system 2102 can be synchronously replicated to the R2 system 2104.

In the configuration of 2400, the R1 device 2124 and R2 device 2126 can be configured and identified as the same LUN, such as LUN A, to the host 2110a. Thus, the host 2110a can view 2108a and 2404 as two paths to the same LUN A, where path 2108a is active (over which I/Os can be issued to LUN A) and where path 2404 is passive (over which no I/Os to the LUN A can be issued whereby the host is not permitted to access the LUN A over path 2404). For example, in a SCSI-based environment, the devices 2124 and 2126 can be configured to have the same logical device identifier such as the same world-wide name (WWN) or other identifier as well as having other attributes or properties that are the same. Should the connection 2108a and/or the R1 data storage system 2102 experience a failure or disaster whereby access to R1 2124 configured as LUN A is unavailable, processing can be performed on the host 2110a to modify the state of path 2404 to active and commence issuing I/Os to the R2 device configured as LUN A. In this manner, the R2 device 2126 configured as LUN A can be used as a backup accessible to the host 2110a for servicing I/Os upon failure of the R1 device 2124 configured as LUN A.

The pair of devices or volumes including the R1 device 2124 and the R2 device 2126 can be configured as the same single volume or LUN, such as LUN A. In connection with discussion herein, the LUN A configured and exposed to the host can also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110*a*, the same LUN A is exposed over the two paths 2108*a* and 2404.

It should be noted although only a single replication link 2402 is illustrated, more generally any number of replication links can be used in connection with replicating data from systems 2102 to system 2104.

Figure 5:
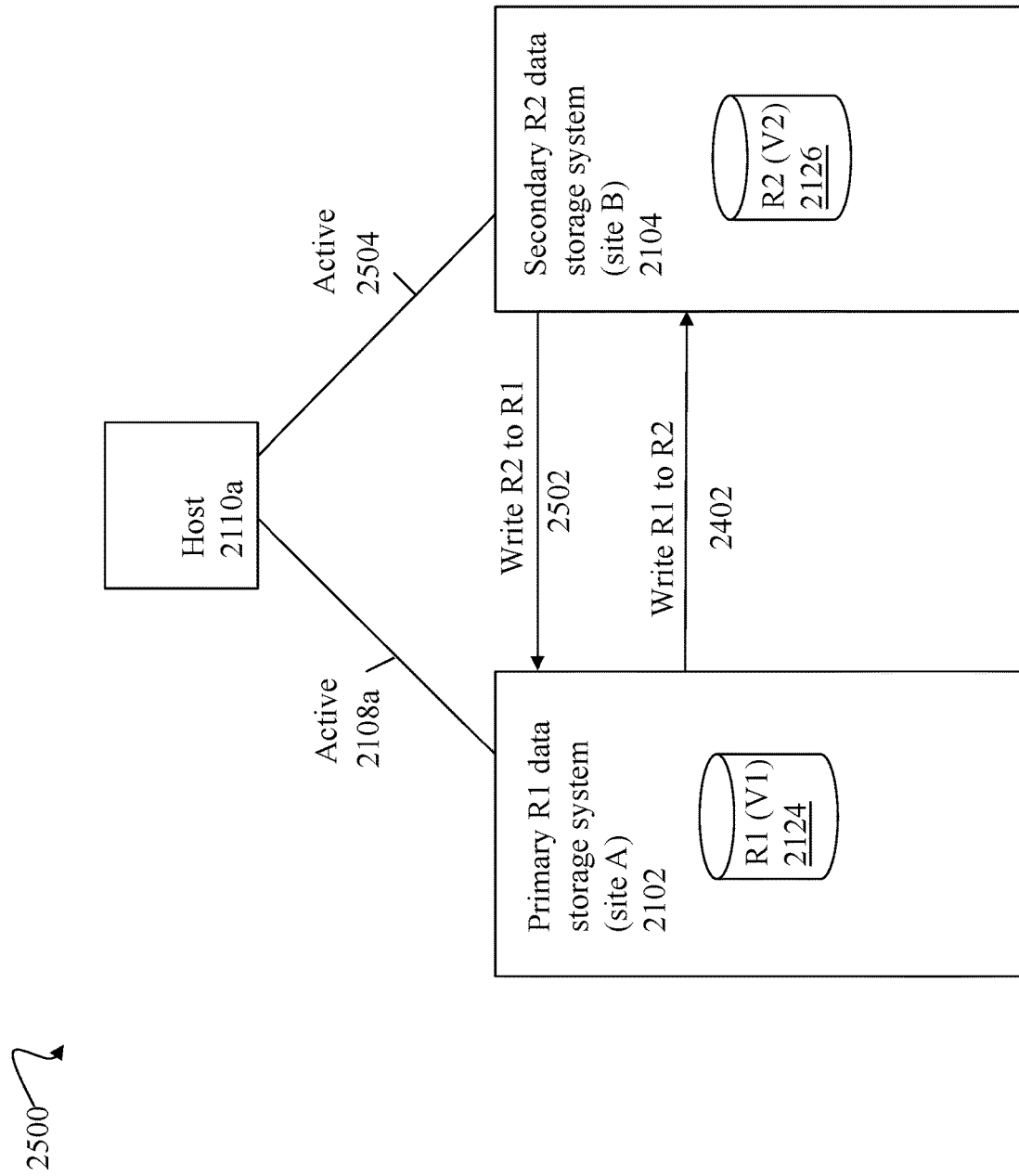
FIG. 5 is an example illustrating an active-active replication configuration of a stretched volume using two-way or bidirectional synchronous replication in at least one embodiment in accordance with the techniques of the present disclosure.

Referring to FIG. 5, shown is an example configuration of components that can be used in an embodiment. The example 2500 illustrates an active-active configuration as can be used in connection with synchronous replication in at least one embodiment. In the active-active configuration with synchronous replication, the host 2110*a* can have a first active path 2108*a* to the R1 data storage system and R1 device 2124 configured as LUN A. Additionally, the host 2110*a* can have a second active path 2504 to the R2 data storage system and the R2 device 2126 configured as the same LUN A. From the view of the host 2110*a*, the paths 2108*a* and 2504 appear as 2 paths to the same LUN A as described in connection with FIG. 4 with the difference that the host in the example 2500 configuration can issue I/Os, both reads and/or writes, over both of the paths 2108*a* and 2504 at the same time.

In at least one embodiment as discussed in more detail below, in a replication configuration of FIG. 5 with an active-active configuration where writes can be received by both systems or sites 2124 and 2126, a predetermined or designated one of the systems or sites 2124 and 2126 can be assigned as the preferred system or site, with the other remaining system or site assigned as the non-preferred system or site. In such an embodiment with a configuration as in FIG. 5, assume for purposes of illustration that system or site R1/A is preferred and the system or site R2/B is the non-preferred.

The host 2110*a* can send a first write over the path 2108*a* which is received by the preferred R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110*a* over the path 2108*a*, where the acknowledgement indicates to the host that the first write has completed.

The first write request can be directly received by the preferred system or site R1 2102 from the host 2110*a* as noted above. Alternatively in a configuration of FIG. 5, a write request, such as the second write request discussed below, can be initially received by the non-preferred system or site R2 2104 and then forwarded to the preferred system or site 2102 for servicing. In this manner, the preferred system or site R1 2102 can always commit the write locally before the same write is committed by the non-preferred system or site R2 2104. In particular, the host 2110*a* can send the second write over the path 2504 which is received by the R2 system 2104. The second write can be forwarded, from the R2 system 2104 to the R1 system 2102, over the link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the preferred R1 system 2102 (e.g., indicating that the second write is committed by the R1 system 2102), the R1 system 2102 sends an acknowledgement over the link 2502 to the R2 system 2104 where the acknowledgment indicates that the preferred R1 system 2102 has locally committed or locally completed the second write on the R1 system 2102. Once the R2 system 2104 receives the acknowledgement from the R1 system, the R2 system 2104 performs processing to locally complete or commit the second write on the R2 system 2104. In at least one embodiment, committing or completing the second write on the non-preferred R2 system 2104 can include the second write being written to the cache of the R2 system 2104 where, at a later point in time, the second write is destaged from the cache of the R2 system 2104 to physical storage provisioned for the R2 device 2126 configured as the LUN A. Once the second write is written to the cache of the R2 system 2104, the R2 system 2104 then returns an acknowledgement to the host 2110*a* over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110*a*, the same stretched LUN A is exposed over the two active paths 2504 and 2108*a*.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108*a* to the system 2102 is stored on the R1 device 2124 and also transmitted to the system 2104 over 2402. The write sent over 2402 to system 2104 is stored on the R2 device 2126. Such replication is performed synchronously in that the received host write sent over 2108*a* to the data storage system 2102 is not acknowledged as successfully completed to the host 2110*a* unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that FIG. 5 illustrates a configuration with only a single host connected to both systems 2102, 2104 of the metro cluster. More generally, a configuration such as illustrated in FIG. 5 can include multiple hosts where one or more of the hosts are connected to both systems 2102, 2104 and/or one or more of the hosts are connected to only a single of the systems 2102, 2104.

Although only a single link 2402 is illustrated in connection with replicating data from systems 2102 to system 2104, more generally any number of links can be used. Although only a single link 2502 is illustrated in connection with replicating data from systems 2104 to system 2102, more generally any number of links can be used. Furthermore, although 2 links 2402 and 2502 are illustrated, in at least one embodiment, a single link can be used in connection with sending data from system 2102 to 2104, and also from 2104 to 2102.

FIG. 5 illustrates an active-active remote replication configuration for the stretched LUN A. The stretched LUN A is exposed to the host 2110a by having each volume or device of the device pair (R1 device 2124, R2 device 2126) configured and presented to the host 2110a as the same volume or LUN A. Additionally, the stretched LUN A is configured for two way synchronous remote replication between the systems 2102 and 2104 respectively including the two devices or volumes of the device pair, (R1 device 2124, R2 device 2126).

In the following paragraphs, sometimes the configuration of FIG. 5 can be referred to as a metro configuration or a metro replication configuration. In the following paragraphs, sometimes the configuration of FIG. 4 can be referred to as a synchronous (sync) configuration, synchronous (sync) replication configuration, or a one-way synchronous (sync) replication configuration. The configurations of FIGS. 4 and 5 include two data storage systems or data centers 2102 and 2104 which can more generally be referred to as sites. In the following paragraphs, the two systems, data centers or sites 2102 and 2104 can be referred to respectively as site A and site B.

Referring to FIG. 4 with the one way synchronous replication configuration with respect to the stretched volume or LUN A (e.g., more generally a stretched storage object or resource), the system or site A 2102 can sometimes be referred to as the sync active site with respect to the stretched volume or LUN due to the active path state 2108a, and the system or site B 2104 can sometimes be referred to as the sync passive site with respect to the stretched volume or LUN due the passive path state 2404.

Referring to FIG. 5 with the metro replication configuration, both systems or sites A 2102 and B 2104 are active with respect to the stretched volume or LUN due to the active path states 2108a and 2504. In at least one embodiment with a metro replication configuration, an active path with respect to a LUN or volume on a system or site can be further characterized as preferred or non-preferred. Thus, for example, the active paths 2108a and 2504 with respect to the stretched volume or LUN can be further characterized as preferred or non-preferred as discussed below in more detail.

In at least one embodiment, the sync replication configuration of FIG. 4 can actually be configured with two-way synchronous replication for the stretched LUN A (as in FIG. 5) rather than one-way synchronous replication. However, as in FIG. 4, the path 2108a can still be configured as active and the path 2404 can still be configured as passive. Thus, the host 2110a can still only have access to the content of the stretched LUN A over one or more active paths 2108a to the sync active site 2102 and can still have no access to the content of the stretched LUN A over one or more passive paths 2404 to the sync passive site 2104. Thus, in some embodiments, two-way synchronous replication for the stretched LUN A can actually be established or configured in the arrangement of FIG. 4 but effectively only one-way synchronous replication from the sync active site 2102 to the sync passive site 2104 is utilized. Put another way, effectively only one-way synchronous replication (from the sync active site 2102 to the sync passive site 2104) for the stretched LUN A can actually be utilized at any point in time since I/Os that are directed to the stretched LUN A and that are sent over the passive path 2404 to the sync passive site 2104 are not actually serviced (e.g., hence no synchronous replication is actually performed from the sync passive site 2104 to the sync active site 2102). Should the status of path 2108a transition to passive and the status of path 2404 transition to active, site 2102 transitions to the sync active role and site 2104 transitions to the sync passive role with one-way replication from the current sync active site 2104 to the current sync passive site 2102.

In an embodiment described herein, the systems or sites 2102 and 2104 can be a SCSI-based system such as SCSI-based data storage array, data center, or appliance. An embodiment in accordance with the techniques herein can include hosts and data storage systems, centers or sites which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a volume or LUN's access state with respect to a particular initiator port and the target port. Thus, in accordance with the ALUA standard, various access states may be associated with a path with respect to a particular device, such as a LUN or volume. In particular, the ALUA standard defines such access states including the active-optimized, active-non optimized, and other states. The ALUA standard also defines other access states. A recognized path (such as recognized by a host as a result of discovery processing) over which I/Os (e.g., read and write I/Os) can be issued to access data of a LUN can have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a "preferred" path state for the particular LUN. A path for a particular LUN having the active-non optimized (or unoptimized) path state may also be referred to herein as a non-optimized or "non-preferred" path for the particular LUN. Thus active-non-optimized denotes a "non-preferred" path state with respect to the particular LUN. Generally, I/Os directed to a LUN that are sent by the host to the data storage system over active-optimized and active-non optimized paths are processed by the data storage system. However, the host may select to send I/Os to a LUN from those preferred paths having an active-optimized state for the LUN. The host may proceed to use a non-preferred path having an active-unoptimized state for the LUN only if there is no preferred or no active-optimized path for the LUN.

Referring again to FIG. 5 in at least one embodiment, the active path 2108a to the system or site A 2102 can be a preferred path for the stretched volume or LUN, where the system or site A 2102 can be sometimes referred to as a metro preferred site. In at least one embodiment with reference to FIG. 5, the active path 2504 to the system or site B 2104 can be a non-preferred path for the stretched volume or LUN, where the system or site B 2104 can be sometimes referred to as a metro non-preferred site.

Although examples in the following paragraphs refer to a stretched volume or LUN, more generally, the techniques of the present disclosure can be generalized for use with a stretched object or resource which can be a volume or LUN, a file system, a virtual volume or vvol used in connection with virtual machines, and any other suitable storage resource or object. The stretched volume or LUN, LUN A, can be configured from a volume pair (V1, V2), where V1 is in site A and V2 is in site B, where V1 and V2 are both configured as the same logical volume or LUN A, where V1 and V2 both have the same identity as presented, viewed or exposed to an external host.

Discussion and examples of the following paragraphs with respect to the specific stretched volume LUN A assume that site A is the preferred site for metro replication (e.g., FIG. 5) or the active site for one way synchronous replication (e.g., FIG. 4), and that site B is the non-preferred site for metro replication or the passive site for one way synchronous replication. Generally, the techniques of the present disclosure can be used in configurations of both one way synchronous replication as in FIG. 4 and also metro replication as in FIG. 5. In both configurations in at least one embodiment, writes from hosts can be committed to site A, the metro preferred or sync active site first and then committed to the metro non-preferred or syn passive site B. After any replication fracture, fault or failure, the writes of V1 of site A need to be re-synchronized with V2 of site B so that both local volumes V1 and V2 are synchronized or "in sync" and have the same data or content so the storage clients, such as the hosts, have full disaster recovery capability upon the occurrence of any next replication failure or fault.

Consistent with other discussion herein, replication failure can be caused by three major classes of faults or failures. The following denotes how the different classes of faults or failures can be handled from an application and user perspective:

1. Loss of storage system or appliance in site A: As mentioned above site A is the preferred site for a metro replication configuration or the active site in a one-way synchronous replication configuration. On loss of the storage system or appliance on site A and without witness deployment, an explicit action by the user can be performed in at least one embodiment to set site B to the metro preferred site. If a witness is deployed, the witness can facilitate ensuring that site B is promoted to the metro preferred site such that host access to site B provides high availability. When site A subsequently becomes available and comes online so as to be in a normal healthy working state, the contents or data of V2 of site B needs to be resynchronized with the contents or data of V1 of site A. Generally, a witness can be another system or component in communication with sites A and B as part of the replication configuration. The witness can facilitate decision-making such as for promotion of site B to the metro preferred site.

2. Loss of storage appliance in site B: Since site A is already designated as the preferred metro site for metro replication or the active sync site for one way synchronous replication, site A can continue its role as the metro preferred or active sync site. When site B recovers and comes online, contents or data of V1 of site A needs to be resynchronized the data or contents of V2 of site B.

3. Loss of networking or replication link between site A and site B: Since site A is already designated as the preferred metro site for metro replication or the sync active site for synchronous replication, site A can continue its role as the metro preferred or sync active site. When the networking or replication link recovers, contents or data of V1 of site A needs to be resynchronized with the data or contents of V2 of site B. In a metro configuration with a witness, the replication link can fail but both sites A and B can be available and online and both sites A and B can communicate with the witness. To avoid data inconsistency between sites A and B in an active-active metro configuration, the witness can facilitate communications between sites A and B to allow site A to continue receiving and servicing I/Os of the stretched LUN A thus continue as the metro preferred site. The witness can also instruct site B to become unavailable and not service I/Os directed to the stretched LUN A until the replication link recovers or is restored to a healthy state for use in replication between sites A and B.

In at least one embodiment, writes can be first committed to the metro preferred or sync active site A and then committed to the metro non-preferred or sync passive site B.

With reference to the configuration of FIG. 4, only writes received at the active sync site A 2102 are serviced since the host cannot write to the stretched volume LUN A over the passive path 2404 to the site B 2104. The associated write I/O processing flow for a write I/O received from the host 2110a at site A 2102 in the synchronous replication configuration of FIG. 4 can include: receiving the write I/O at site A 2102, committing the write to site A 2102, sending (2402) the write (a remote write request) from site A 2102 to site B 2104, committing the write to site B 2104, sending an acknowledgement from site B 2104 to site A 2102 regarding commitment of the write, and returning a response or acknowledgement from site A 2102 to the host 2110a.

With reference to the configuration of FIG. 5, writes can be received and serviced at both site A 2102 and site B 2104. As a first case, the associated write I/O processing flow for a write I/O received from the host 2110a at site A 2102 in the metro replication configuration of FIG. 5 can include: receiving the write I/O at site A 2102, committing the write to site A 2102, sending the write (a remote write request) from site A to site B 2104, committing the write to site B 2104, sending an acknowledgement from site B 2104 to site A 2102 regarding commitment of the write, and returning a response or acknowledgement from site A 2102 to the host 2110a. As a second case, the associated write I/O processing flow for a write I/O received from the host 2110a at site B 2104 in the metro replication configuration of FIG. 5 can include: receiving the write I/O at site B 2104, forwarding the write to site A 2102, committing the write to site A 2102, sending the write (a remote write request) from site A 2102 to site B 2104, committing the write to site B 2104, sending an acknowledgement from site B 2104 to site A 2102 regarding commitment of the write, returning an acknowledgement from site A 2102 to site B 2104 regarding completion of the write, and returning a response or acknowledgement from site B 2104 to the host 2110a.

In at least one embodiment, in-progress or incomplete writes can be tracked by only the metro preferred or sync active site in persistent memory. In the example being described, site A is the metro preferred or sync active site so site A can track the in-progress writes in persistent memory. In at least one embodiment, the persistent memory used to track the in-progress writes can be a form of non-volatile storage or memory such as NVRAM (non-volatile random access memory). In at least one embodiment, the persistent memory used to track the in-progress writes can be NVRAM where the content stored in the NVRAM is mirrored. In at least one embodiment, the in-progress writes can be tracked and persistently stored by the metro preferred or sync active site in an in-progress map.

In at least one embodiment using the in-progress map, for each write I/O directed to the stretched LUN A, the metro preferred or sync active site A can record an in-progress write in its in-progress map prior to sending the remote write request for the write I/O to site B. Site A can remove the record for the in-progress write from the in-progress map once site A receives an acknowledgement from site B regarding commitment of the corresponding remote write request (e.g., where the site B has committed or completed the corresponding remote write request corresponding to the in-progress write removed from the map).

Figure 6A:
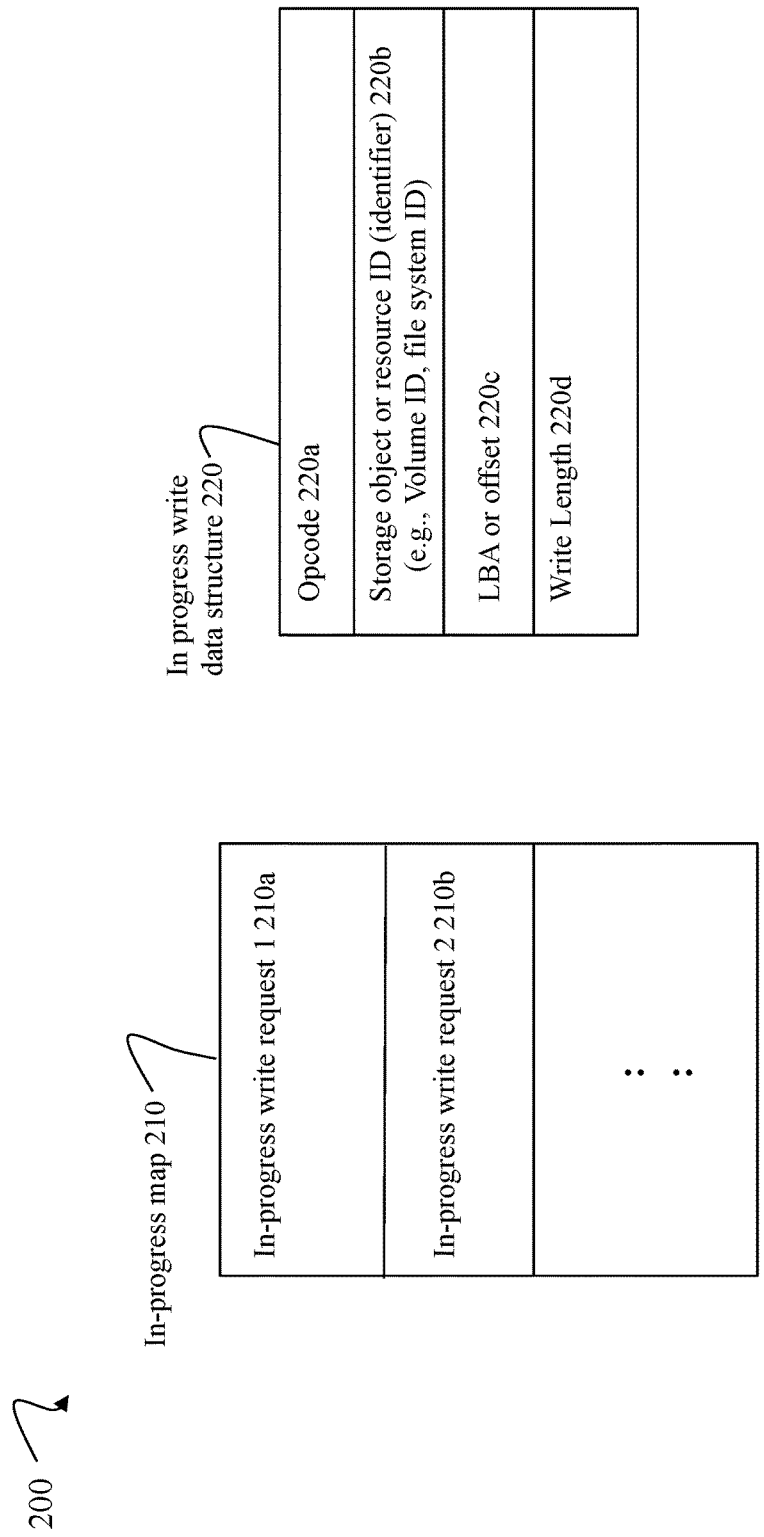
FIG. 6A is an example of an in-progress map and in-progress write data structure that can be used in at least one embodiment in accordance with the techniques of the present disclosure.

Referring to FIG. 6A, shown is an example 200 illustrating the in-progress map (sometimes referred to as a map) of in-progress writes and illustrating an in-progress write data structure in at least one embodiment in accordance with the techniques of the present disclosure.

The in-progress map 210 can be implemented using any suitable structure such as a table or list including an entry for each in-progress write request. The in-progress map 210 includes a first entry 210a for in-progress write request1, a second entry 210b for in-progress write request2, and so on.

The structure 220 identifies fields that can be included in an in-progress write data structure in at least one embodiment. The fields of the structure 220 can be included in each entry, such as 210a, of the in-progress map 210. The in-progress write data structure 220 can include an opcode (operation code) 220a, a storage object or resource ID (identifier) 220b, and LBA or offset 220c, and a write length 220d. Generally, for an in-progress write recorded as an entry in the map 210, the structure 220 identifies a particular operation type (opcode 220a) of the recorded write request which modifies content or data of a target location of a particular storage resource of object (220b), where the target location which is modified has a starting offset or logical location (220c) and where the target location has a specified size or length (220d).

The opcode 220a can denote the particular type of request, command, or operation which generally modifies content. For example, the type of operation can be a write I/O operation. In some embodiment, additional commands, requests and/or operations can be supported and used for modifying, writing, overwriting, deleting or removing content of a storage resource or object. For example, in at least one embodiment, supported commands or operations having a unique corresponding opcode can include one or more of the following operations: write I/O operation, UNMAP command or operation (e.g., storage reclamation operation), and an ATS (atomic test and set) command.

In some embodiment, supported operations tracked as in-progress requests can include offload copy operations, commands or methods such as the XCOPY (extended copy) command and ODX (offload data transfer) command. It should be noted that to support such offload copy operations or other operations, the structure 220 can also include additional fields not illustrated.

Generally, the supported commands which can be characterized as in-progress write requests tracked in the map 210 can include one or more offload copy methods or commands, such as the XCOPY and the ODX command, noted above where such offload commands can be used for data copying between targets in the same system. The XCOPY command is a SCSI command included in the SCSI standard. The ODX command is a token-based offload copying command developed Microsoft Corporation. Existing implementations, for example, can use XCOPY and/or ODX for copying within a single system. Generally, the offload copy operation request can be issued by an external data storage system client, such as a host, as well as an internal data storage system client. In at least one embodiment, the offload copy operation or command, such as the XCOPY command noted above, is a request to perform an offload copy operation from a source to a destination or target. The source and the destination of the XCOPY or other offload copy operation can be specified in any suitable manner. For example, in at least one embodiment, the source can identify one or more logical devices or LUNs, and an associated LBA range of each of the one or more LUNs of the source; and the destination can also identify one or more logical devices or LUNs, and an associated LBA range of each of the one or more LUNs of the destination. The particular manner in which the LUNs are identified can vary with the particular protocol used to access the LUNs. For example, in at least one embodiment in accordance with the SCSI protocol, a LUN of the source or destination of the XCOPY command can be identified using the world wide name (WWN) used to uniquely identify the LUN at a protocol level identifier across the first and second systems, or more generally across multiple data storage systems. Such an offload copy command like XCOPY requests or instructs the data storage system to generally perform an offload copy command internal within the data storage system because both the source and destination of the copy command are within the same data storage system. Generally, the client, such as the host, requests using the XCOPY command that the data storage system manage the copying of the data from the source to the destination. The source and destination of the XCOPY command refer to storage objects, such as block-based addresses of logical devices, volumes, or LUNs, typically in the same system. For example, the source may be a location or logical address on a source device denoting a source LUN of the data storage system that received the XCOPY command. The destination or target of the XCOPY command may be a location or logical address on a target device that is also a logical device denoting the destination or target LUN of the data storage system that received the XCOPY command. In an embodiment supporting such offload copying operations, the structure 220 can also include additional fields to identify not only the target but also the source of the operation.

In at least one embodiment, supported commands which can be tracked as in-progress write requests in the map 210 can include a WRITE SAME command. In at least one embodiment, the WRITE SAME command can be used to fill or write to a range of blocks on disk with a pattern or block of data specified by the command. For example, WRITE SAME can be used to write zeroes or some other specified content to a range of blocks. If the WRITE SAME command is supported, the structure 220 can also include additional fields to identify the source of the pattern or content written to the target range of blocks.

For purposes of illustration, examples of the techniques of the present disclosure may refer to a particular type of write request, such as a write I/O operation, and a particular type of storage resource or object, such as a volume or LUN which is stretched. More generally, the techniques of the present disclosure can be used with any suitable type of write request and storage resource or object.

In at least one embodiment, the particular opcodes and thus values stored in instances of field 220a of various entries in the map 210 can depend, at least in part, on the particular standards and protocols used in the embodiment. For example, in at least one embodiment, the techniques of the present disclosure can be implemented in environments supporting the SCSI and NVMe (Non-Volatile Memory Express) standards and protocols. As such, the particular opcodes and types of in-progress write requests of the map 210 can include those commands or operations allowable in the SCSI and/or NVMe standards and protocols.

In at least one embodiment, the storage resource or object ID 220b can denote a volume, logical device or LUN. In at least one embodiment, the field 220b can generally be an identifier uniquely identifying a storage object or resource which can be any suitable supported resource type. For example, in at least one embodiment where supported object or resource types include volume and file system, the storage resource or object ID 220b can uniquely identify a particular volume or file system.

In at least one embodiment, the length 220d can denote a number or amount of any suitable storage units. For example, the length 220d can be an integer value denoting a length as a number of sectors.

In at least one embodiment in which the supported or tracked in-progress write request types are write I/O operation, ATS command and UNMAP command, the opcode field 220a can be 2 bytes in size, the storage resource or object ID 220b can be 4 bytes in size, the LBA field 220c can be 8 bytes in size, and the length field 220d denoting a number of sectors can be 2 bytes in size (e.g., based on the maximum allowable I/O size for the supported commands). In some embodiment, the storage resource or object ID 220b can be generally larger than 4 bytes, such as 16 bytes. Generally, the size of the field 220b can be based, at least in part, on any one or more of the following: depending on the number of bits/bytes needed to uniquely identify a storage resource or object, depending on the particular supported resource types, depending on the particular methodology used to represent the storage resource or object ID.

In at least one embodiment, the size of the structure 220, and thus the size of each tracked in-progress write request can be 16 bytes. In at least one embodiment, the map 210 can store a maximum of 1 million outstanding or in-progress write requests. If each record of the map 210 is 16 bytes and the map can store 1 million entries for 1 million in-progress write requests, 16 MB of persistent memory can be used for storing the recorded or tracked in-progress write requests of the map 210.

Generally, the in-progress map 210 can be indexed and accessed using any suitable technique. In at least one embodiment, the map 210 can be implemented as a hash list or hash table. The hash list or table can be indexed using a key, where the key can generally be based, at least in part, on one or more of the fields of the structure 220. In at least one embodiment, the key can be based, at least in part, on the target location denoted by the combination of the storage resource or object ID 220b and LBA 220c. In at least one embodiment, the key can be based, at least in part, on the target location denoted by the combination of the storage resource or object ID 220b, LBA 220c and length 220d. The key is then mapped to a particular index or entry of the hash table. For a particular in-progress write having corresponding values stored in an instance of the structure 220, the key K can be provided as an input to a hashing function or algorithm H, where H(K) can be the index or entry I of the hash table storing the particular instance of the structure 220. In at least one embodiment to handle hash collisions where two different keys K1 and K2 for two different corresponding instances of the structure 220 are mapped to the same index or entry I of the hash table H, each entry or index of the hash table can be associated with a second list of structures. Each structure in the second list associated with H(I) can denote an instance of the structure 220 having an associated key K which is mapped to H(I). More generally, an embodiment can use any suitable technique can be used to handle resolution of hash collisions. It should be noted that in an embodiment implementing the map 210 as a hash table or list, a minimal additional amount of storage space can be needed over the 16 MB noted above (e.g., since the 16 MB denotes just the storage needed for the recorded in-progress write requests of the map 210, where the additional storage can be needed in connection with management and implementation of the hash table or list).

What will now be described is further detail regarding tracking in-progress write requests on the metro preferred or sync active site in at least one embodiment in accordance with the techniques of the present disclosure. Continuing with the above example, the site A can be the metro preferred or sync active site which tracks in-progress write requests.

Consistent with other discussion herein in at least one embodiment, all writes can be committed to site A, the metro preferred or sync active site first. Once the local write is committed to site A, a remote write request is initiated from site A to site B. The techniques of the present disclosure provide for site A tracking such remote write requests as in-progress write requests in the map 210. Once an acknowledgement for the completion of the remote write is received by site A from site B, an entry of the map 210 corresponding to the remote write request can be cleared or removed from the map 210. At any point in time, the map 210 tracking the remote writes or in-progress writes has entries only for outstanding or in-progress writes. In at least one embodiment, in-progress writes of the map 210 have been committed on site A. Additionally, for each in-progress write of the map 210, a remote write request may have been sent to site B but which has not yet been acknowledged by site B (e.g., site A has not yet received an acknowledgement from site B regarding commitment or completion of the remote write request). In at least one embodiment, the map 210 can be stored on non-volatile storage of site A.

In at least one embodiment, an API (application programming interface) can be available and used to retrieve entries from the map 210 when needed during resynchronization processing discussed elsewhere herein in more detail. In the present disclosure in at least one embodiment, the API can be named "getSyncMetroInProgressRequests( )" which returns a complete list of all unacknowledged, in-progress write requests. The foregoing API can be a remote or inter-site API call from a first site, such as site B, to obtain a copy of the in-progress write requests of the map 210, as stored on a second remote site, such as site A. The API can also be an intra-site or local API call made within a single site, such as site A.

It should be noted that the metro preferred or sync active site, such as site A, can generally maintain and use the in-progress map such that entries can be accordingly added and/or removed when replication is established. Once replication has stopped or is fractured such as due to a failure of a replication link and/or failed site or system, no new entries may be added to the in-progress map since there are no remote write requests issued between sites of the fractured or failed replication configuration.

Referring to FIG. 6B, shown is a flowchart 250 of processing steps that can be performed in at least one embodiment in accordance with the techniques of the present disclosure. The flowchart 250 summarizes processing described in connection with maintenance of the in-progress map 210 of FIG. 6A.

At the step 252, the metro preferred or sync active site A receives a write I/O operation or request W1 directed to stretched LUN A from a host. The write request W1 can be directly received by site A from the host. Alternatively in a metro configuration, the write request W1 can be initially received by the non-preferred site B and then forwarded to site A for servicing.

The stretched LUN A can be configured from local volume or resource V1 of site A and local volume resource V2 of site B, where V1 and V2 are both configured to have the same identity of "LUN A". From the perspective of the host, the host views both V1 and V2 as the same resource, logical device, volume or LUN with identity "LUN A". From the step 252, control proceeds to the step 254.

At the step 254, site A can commit the write request W1 locally to V1, record an entry E1 for an in-progress write request in the in-progress map for the write request W1, and then send a remote write request R1 to site B. The remote write request R1 can correspond to the received write W1 from the host and can request that site B also commit or perform the write W1 with respect to its local resource V2. From the step 254, control proceeds to the step 256.

At the step 256, site B can receive the remote write request R1 and perform processing to commit the write request W1 to its local volume or resource V2. Once the remote write request R1 is committed on site B, the site B can return an acknowledgement for the remote write request R1 to site A. From the step 256, control proceeds to the step 258.

At the step 258, site A can receive the acknowledgement from site B. Responsive to receiving the acknowledgement, site B can delete or remove from the in-progress map a corresponding entry E1 for the in-progress write request corresponding to the host write request W1. From the step 258, control proceeds to the step 260.

At the step 260, an acknowledgement regarding completion of W1 can be returned to the host that originated W1. Generally, the particular one of the sites A or B which initially received the write directly from the host can return the acknowledgment to the host. Thus, as a first case, if W1 was received directly at site A from the host and not indirectly through site B, the acknowledgement can be returned directly from site A to the host. Alternatively, as second case, if W1 was received initially at site B and then forwarded to site A, site A can return a response or acknowledgement to site B that the write W1 is complete. In response, site B can return a response or acknowledgement regarding completion of W1 to the host that originated the write request W1.

What will now be discussed are various scenarios in accordance with the techniques of the present disclosure.

Consider a first scenario, scenario 1, where site A, the metro preferred or sync active site, fails or becomes unavailable and the metro non-preferred or sync passive site B is the remaining healthy site which services I/Os directed to the stretched volume while site A is down or unavailable. In response to the failure of site A, site B which is currently the non-preferred or passive site, can be promoted to the metro preferred or sync active site with respect to a stretched volume or LUN A, configured from V1 on site A and V2 on site B, where V1 and V2 are configured to have the same volume identity from the perspective of the external host.

In a first step S1, as part of promoting site B with respect to the stretched volume or LUN A, site B can take an internal snapshot B1 of V2. The first new subsequent write to V2, and thus the stretched LUN A, after promoting site B can occur only after the snapshot B1 is taken. Following the step S1 is a step S2.

In the step S2, site A recovers and an internal snapshot A1 is taken of V1 which needs to be synchronized with V2 of site B. Site B continues to be the only site servicing I/Os directed to the stretched LUN A using its local volume V2.

At this point the snapshot A1 can have a first set of writes which have been committed by site A and thus applied to V1 and included in the snapshot A1. The writes of the first set may have been applied to V1 immediately prior to the fault when site A went down. The remote write requests for writes of the first set can be recorded in the map 210. However, the remote write requests of the map 210 may not have been actually sent by site A and received by site B before site A went down. Thus snapshot A1 can have writes which have not yet been copied and not yet applied to snapshot B1 (which is a snapshot of V2 of site B). In this case, the map 210 can include writes which have been applied or included in snapshot A1 but which have not been applied or are not included in the snapshot B1. In one aspect, snapshot A1 can be a superset of writes or modifications made with respect to snapshot B1 where the snapshot A1 includes writes of the first set not yet applied or reflected in snapshot B1. At this point the snapshot A1 is also missing a second set of writes which were serviced by site B while site A was down or recovering. It should be noted that subsequent resynchronization processing handles application of writes of the above-noted first set and second set. Following the step S2 is a step S3.

In the step S3, using the above-noted API "getSyncMetroInProgressRequests( )", site B issues a remote call to site A to retrieve the map 210 from site A. The step S3 includes site B receiving the map 210, or entries thereof, from the remote site A in response to site B issuing the API call "getSyncMetroInProgressRequests( )" to site A. The LBAs, or more generally target locations, represented in the entries of the retrieved map 210 may have been over-written on site B while site B was servicing I/Os directed to the stretched LUN A while site A was down or recovering. In at least one embodiment to handle this case, data-less writes can be used. The goal of the re-synchronization process is to ensure that site A and site B have the same data at the end of the resynchronization. Using a data-less write operation or API call with the map 210, site B issues a data-less write request to the volume V2 on site B (the production volume V2 on site B), where the data-less write request marks as modified on V2 those blocks or LBAs of the map directed to the stretched LUN A. In particular, the entries of interest which are applied and sent in the data-less write request or operation include entries of the map where field 220b identifies the stretched LUN A. For such entries of the map denoting writes to stretched LUN A, fields 220c-d denote the LBA ranges which are marked as modified by the data-less write with respect to the current or production volume V2 of site B. Generally, the data-less write request marks specified blocks, such as LBAs, as modified on V2 without actually writing any content to the storage resource such as the volume V2. In an example implementation, the data-less write request can be configured to mark the specified blocks as modified in a mapper layer without writing any content to the impacted storage resource V2 resident on site B. The foregoing data-less write ensures that the LBA ranges of the map related to the stretched LUN A are transferred to site A when a snapshot difference (snap diff) operation is done between snapshots as described in connection with the step S5 below. By using the data-less write, content or data for all the LBA ranges in the map related to the stretched LUN A will be transferred from site B to site A as part of resynchronization. In at least one embodiment, the data-less write provides no write buffer of content to be written but rather records that the target location's LBA range is marked as changed or modified. In at least one embodiment, the above-noted mapper layer can record which blocks have been modified by writes. The data-less write operation provides for the mapper layer marking, as modified, blocks of the data-less write operation which do not actually have content or data written. In this manner, the mapper layer can collectively track modified blocks of V2 on site B which includes, in the aggregate, blocks of V2 actually modified by write operation and blocks marked as modified by the data-less write. From the step S3, control proceeds to the step S4.

At the step S4, an internal snapshot B2 is taken of V2 on site B, where the snapshot B2 can denote a current PIT copy of V2. It should be noted that I/Os directed to the stretched LUN A can still be received and serviced by site B using V2 after taking snapshot B2. From the step S4, control proceeds to the step S5.

At the step S5, a snapshot difference or snap diff operation is performed with respect to the snapshots B1 and B2 (e.g., denoted as snap diff (B1, B2)) to determine the modified blocks between snap B1 and snap B2. In at least one embodiment the snap diff operation can use a list of modified blocks maintained by the mapper layer to determine which blocks of V2 are marked as modified between the time when snapshot B1 is taken and when snapshot B2 is taken. Thus in at least one embodiment, the snap diff operation, snap diff (B1, B2), can return a list of blocks of the volume V2 which have been modified between snapshots B1 and B2. Note that the prior data-less write performed in the step S3 effectively adds the blocks of the map 210 directed to the stretched LUN A to the list of modified blocks determined by the snap diff operation. Let T denote the time interval between when snapshots B1 and B2 are taken. Thus the list returned by the snap diff (B1, B2) identifies, in the aggregate, the following modified blocks: A) the blocks of the volume V2 actually written to with write data or content during the time interval T between when the snapshots B1 and B2 are taken (e.g., for writes from hosts directed to LUN A where such writes are received and serviced by site B during the time interval T); and B) the target blocks or locations of the map 210 which are directed to the stretched LUN A. Following the step S5 is a step S6.

In the step S6, the list of modified blocks as returned by the snap diff operation of step S5 (e.g., snap diff (B1, B2)) denotes the content to be transferred from site B to site A and applied to the snapshot A1. The step S6 generally applies the data modifications denoted by the list of modified blocks to the snapshot A1. The step S6 can include, for each block on the list of modified blocks: obtain the data or content of the block from snapshot B2, send the data or content to site A, and apply the data or content to a corresponding block of the snapshot A1 of site A.

It should be noted that performing the step S6 may restore prior content to an LBA of snapshot A1 where the LBA is identified in the map as being included in an in-progress write only committed by site A but not site B. For example, consider a metro replication configuration as in FIG. 5 where writes can be received and serviced by both site A and B. Assume that LUN A, LBA 5 has the content C1 at a first point in time T1 before site A failed, where both V1 and V2 store C1 at LBA 5 at the first point in time T1. At a second point in time T2 subsequent to T1, site A can receive a write W1 that writes C2 to LBA 5. Site A can a) commit and store C2 to V1, LBA 5; b) store an entry E1 in the map 210 for the in-progress write W1; and c) send a remote write request from site A to site B requesting that site B update its local resource V2, LBA 5 from C1 to C2. While E1 is in the map and thus before site A receives an acknowledgement from site B regarding committing W1, site A fails and then recovers triggering performance of the steps S1-S6. Assume that, during the time while site A is down and recovers while site B is servicing I/Os directed to LUN A using its local resource V2, there are no writes or modifications to LUN A, LBA 5 serviced by site B. Also assume that there are no writes to LUN A, LBA 5 during any of the processing of steps S1-S6. In this case, C1 is stored at V2, LBA 5. The step S3 performs a data-less write to V2, LBA 5; the snap diff operation of step S5 returns a list including LBA 5; and the step S6 sends C1 from site A to site B as the content stored at V1, LBA 5. In this manner, the step S6 results in V1, LBA 5 of site A being restored or updated to the prior content C1 even though V1, LBA 5 had, before the site A failure, been updated to C2. Synchronization processing provides for synchronizing content of V1 of site A and V2 of site B. Since the acknowledgement of W1 has not yet been returned to the host, synchronization processing in the step S6 can include restoring LBA 5 to C1 where both V1 and V2 store C1 at LBA 5.

In one aspect, completion of the steps S1-S6 can denote completion of an initial resynchronization point. After completion of steps S1-S6, the snapshot A1 of site A has the data or content that V2 of site B had at the time of fracture or replication failure in combination with any data written to V2 of site B during the time from when site A was down until site A recovered from failure.

At this point, resynchronization can continue between site A and site B with respect to V1 of site A and V2 of site B, where V1 and V2 are both configured as the LUN A. Such subsequent resynchronization can include performing delta resynchronizations such that V1 and V2 of the two respective sites A and B are synchronized.

Note that after completion of the steps S1-S6, replication between sites A and B has not yet been re-established; and site A is not active servicing I/Os for the stretched volume LUN A. Since the snapshot B2 of V2 is taken in step S4, writes to the stretched volume LUN A can continue to be received serviced only by site B using its local copy V2. Thus, there can be additional writes applied to V2 of site B since the snapshot B2 was taken. Such additional writes applied since taking snapshot B2 have not yet been applied to V1 of site A.

Thus, as noted above, additional resynchronization processing can be performed by performing one or more iterations or cycles of delta resynchronization. Each such delta resynchronization iteration or cycle "N" can include taking a snapshot N of V2 on site B, determining a snap diff between snap N of V2 and snap N-1 of V2 (as taken during resynchronization processing) to determine a list of differences (e.g., modified blocks), and data corresponding to the differences can be sent from site B to the site A and applied to snapshot A1 of V1. While delta synchronization iteration or cycle "N" is performed, there can be yet additional writes which are applied to V2 on site B and which can be captured in the next subsequent resynchronization iteration or cycle "N+1". In at least one embodiment, the foregoing delta resynchronization cycle processing can be repeated until the amount or size of the differences of the most recent delta resynchronization cycle is less than a specified threshold. Responsive to the size of the delta or data difference being less than the threshold on the last or most recent delta synchronization cycle, first processing can be performed which includes establishing write mirroring or synchronous replication to mirror writes for stretched LUN A between sites B and A. In at least one embodiment, the synchronous replication established can be two-way or bi-directional synchronous replication between sites A and B. Note at this time, site B is still the active or preferred site receiving and servicing I/Os to LUN A using V2 but site A is not yet active/not yet receiving and servicing I/Os to LUN A. Thus the synchronous replication can provide for replicating, from site B to site A, writes directed to LUN A which are received by site B subsequent to the last or most recent delta synchronization cycle. Additionally, the first processing can include sending the last or most recent set of data changes for the last or most recent delta synchronization cycle from site B to site A, and then applying those changes to the local resource (e.g., snapshot A1 of V1) of site A. Once the last or most recent set of data changes from the last or most recent delta synchronization cycle have been applied on the site A, further processing can be performed to restore the synchronous replication configuration (e.g., FIG. 4) or the metro replication configuration (e.g., FIG. 5) as it was prior to failure of site A. This further processing can include transitioning site A to the metro preferred or sync active state to commence servicing I/Os. Also, site B can transition to the metro non-preferred or sync passive state depending on the replication configuration. Thus, establishing synchronous replication for the stretched volume can include sending, from site B to site A, any writes to the stretched volume received at site B since the last or most recent snapshot of V2 was taken in the last or most recent delta synchronization cycle. In this manner, the re-established synchronous replication processing can automatically resume and handle replication of any host writes made to the stretched volume LUN A where such writes are received at site B. In one aspect, each of the delta resynchronization cycles denotes an asynchronous replication of writes to the stretched volume from site B to site A. Thus resynchronization can continue in an asynchronous manner using delta resynchronization cycles until the amount or size of the data modified (as transmitted in the cycle from site B to site A) is less than a specified threshold size. Responsive to the amount or size of the data modified in a most recent delta resynchronization cycle being less than the threshold, write mirroring or synchronous replication can be established for LUN A. The synchronous replication can be established and performed while the last set of data changes of the last delta resynchronization cycle is sent from site B to site A. Once the last set of data changes of the last delta synchronization cycle has been applied to snapshot A1 of V1 of site A, V1 and V2 are synchronized. Once the last set of data changes are applied such that snapshot A1 of V1 of site A and V2 of site B are resynchronized (after applying the last set of data changes to V1), site A can transition to a metro preferred or a synch active state to service I/Os for the stretched volume.

To further illustrate, in at least one embodiment, writes can continue to be serviced by the site B and applied to the volume V2 on site B subsequent to taking snapshot B2 of V2. Thus there can be additional writes after taking snapshot B2 which now also need to be applied to the snapshot A1 of volume V1 on site A. To accomplish this, delta resynchronization cycle 1 can be performed. In delta resynchronization cycle 1, snapshot B3 can be taken of V2, a snap diff between snapshot B3 of V2 and snapshot B2 of V2 can be performed to determine a list of differences (e.g., modified blocks), and data corresponding to the differences can be sent to the site A and applied to the snapshot A1 of V1 of site A. Additional writes can be received and applied to V2 subsequent to taking snapshot B3 of V2. In a manner similar to that just described, delta resynchronization cycle 2 can be performed. In delta resynchronization cycle 2, another snapshot B4 can be taken of V2, a snap diff between snapshot B3 of V2 and snapshot B4 of V2 can be performed to determine a list of differences (e.g., modified blocks), and data corresponding to the differences can be sent from site B to site A and applied to snapshot A1 of V1 of site A. Since writes can continually be received and applied by only site B to its local copy V2 while completing resynchronization of V1 and V2 between sites A and B, there can be yet further resynchronization cycles. However, assume that size of the differences of resynchronization cycle 2 is less than a specified threshold. In this case, mirroring (synchronous replication) of writes from site B to site A can be established for LUN A while the last set of data differences of delta resynchronization cycle 2 are applied to snapshot A1 of V1 of site A. Once the last set of data differences are applied, V1 (more specifically snap A1) and V2 are resynchronized and site A can transition to the metro preferred or sync active state to commence servicing I/Os using its synchronized copy of V1. Establishing synchronous replication for the stretched volume can include sending, from site B to site A, any writes to the stretched volume received at site B since the last or most recent snapshot B4 of V2 has been taken in the last or most recent synchronization cycle. Generally, any additional processing can be performed to restore the desired replication configuration as prior to failure of site A.

Figure 7:
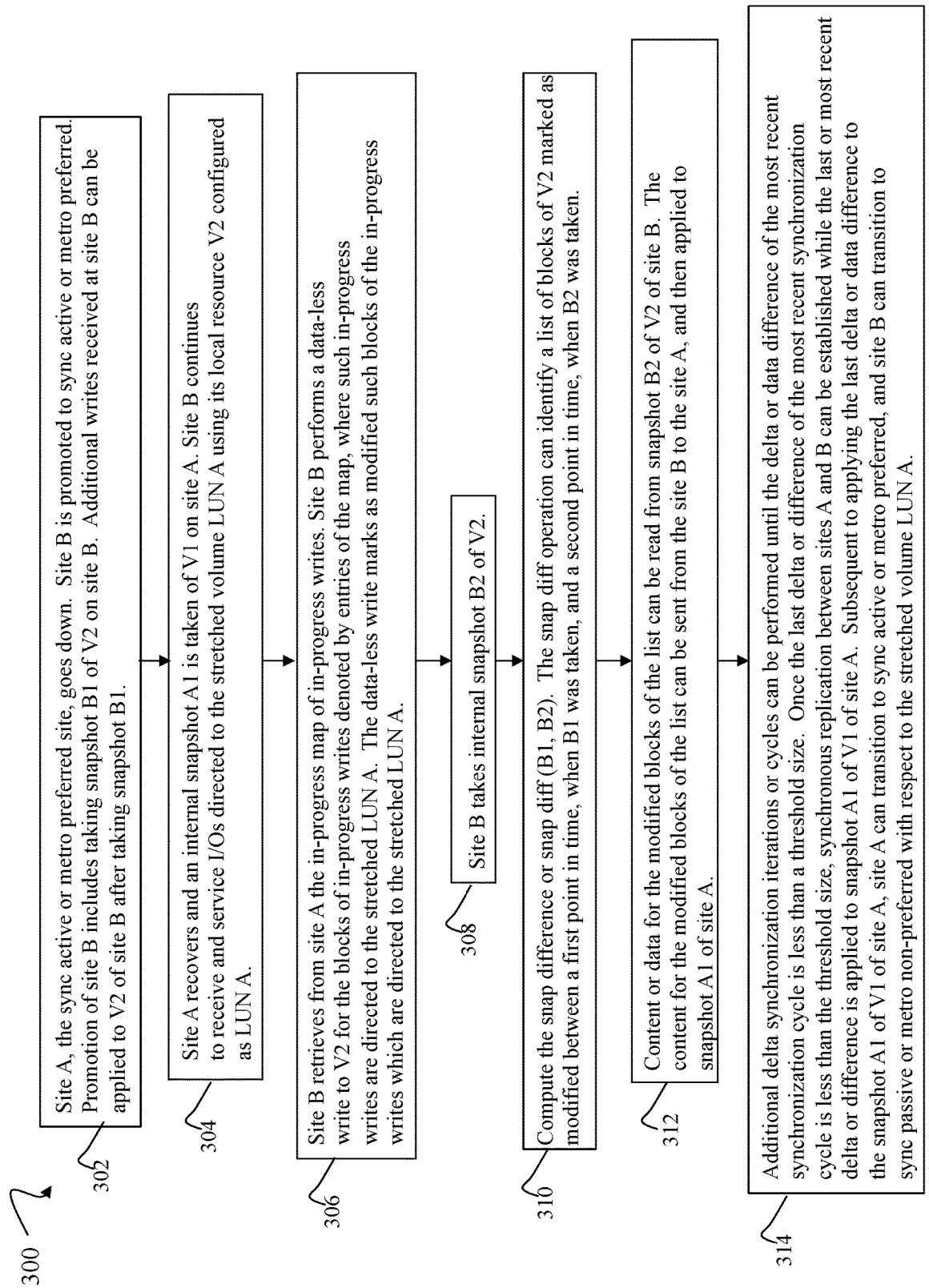

Referring to FIG. 7, shown is a flowchart 300 of processing steps that can be performed in at least one embodiment in accordance with the techniques of the present disclosure in connection with the first scenario 1 noted above. The steps of FIG. 7 summarize processing discussed above. Assume the stretched volume LUN A is configured from V1 of site A and V2 of site B as discussed above.

At the step 302, site A, the sync active or metro preferred site, goes down. In the step 302, site B is promoted to sync active or metro preferred. Promotion of site B includes taking snapshot B1 of V2 on site B. Additional writes received at site B can be applied to V2 of site B after taking snapshot B1. From the step 302, control proceeds to the step 304.

At the step 304, site A recovers and an internal snapshot A1 is taken of V1 on site A. Site B continues
    to receive and service I/Os directed to the stretched
       volume LUN A using its local resource V2 configured
       as LUN A. From the step 304, control proceeds to the step
       306.

At the step 306, site B retrieves from site A the in-progress map of in-progress writes. Site B performs a data-less write to V2 (current or production volume of V2) for the blocks of in-progress writes denoted by entries of the map, where such in-progress writes are directed to the stretched LUN A. The data-less write marks as modified such blocks of the in-progress writes which are directed to the stretched LUN A. From the step 306, control proceeds to the step 308.

At the step 308, Site B takes internal snapshot B2 of V2. From the step 308, control proceeds to the step 310.

At the step 310, processing is performed to compute the snap difference or snap diff (B1, B2). The snap diff operation can identify a list of blocks of V2 marked as modified between a first point in time, when B1 was taken, and a second point in time, when B2 was taken. Thus the list of modified blocks identifies blocks of LUN A indicated as modified, where the modified blocks include: blocks of LUN A identified in the in-progress map (e.g., per the data-less write of step 306), and blocks of LUN A which have been actually written to between a first point in time when snapshot B1 was taken and a second point in time when snapshot B2 was taken. From the step 310, control proceeds to the step 312.

At the step 312, content or data for the modified blocks of the list can be read from snapshot B2 of V2 of site B. The content for the modified blocks of the list can be sent from the site B to the site A, and then applied to snapshot A1 of V1 of site A. From the step 312, control proceeds to the step 314.

At the step 314, additional delta synchronization iterations or cycles can be performed until the delta or data difference of the most recent synchronization cycle is less than a threshold size. Once the last delta or difference of the most recent synchronization cycle is less than the threshold size, synchronous replication between sites A and B can be established while the last or most recent delta or difference of the most recent synchronization cycle is applied to snapshot A1 of V1 of site A. Subsequent to applying the last delta or data difference at site A, site A can transition to sync active or metro preferred, and site B can transition to sync passive or metro non-preferred with respect to the stretched volume LUN A.

What will now be described is a second scenario, scenario 2, where site B, the metro non-preferred or sync passive site, fails or becomes unavailable and site A is the remaining healthy site which services I/Os directed to the stretched volume LUN A while site B is down or unavailable. Consistent with discussion above for the first scenario, scenario 1, the stretched volume or LUN A, is configured from V1 on site A and V2 on site B, where V1 and V2 are configured to have the same volume identity of LUN A from the perspective of the external host.

In a first step S11, when site A detects that site B has failed and there is polarization, all incoming requests directed to LUN A which are received at site A are quiesced or paused temporarily so that servicing does not commence for any new requests directed to LUN A. Generally, the step S11 includes quiescing I/O activity directed to the stretched resource or volume LUN A. Polarization occurs when one of the sites A and B in a replication configuration is not responding and such non-responsiveness results in a fractured or failure status regarding replication of data for stretched resources configured on sites A and B. When polarization is invoked and the metro preferred site A determines that the metro non-preferred site B is not available, the replication traffic is stopped and host I/O on the preferred site A continues. In at least one embodiment, quiescing I/O activity of the step S11 can include pausing processing of new requests directed to LUN A or other stretched storage resources configured for replication in a configuration with the failed site B. Quiescing I/O activity can include pausing new I/O requests such as new write requests received at site A from a host, where such write requests are directed to the stretched LUN A or other storage resource configured for replication with failed site B. Quiescing can include pausing sending any acknowledgements to hosts or other storage clients for pending I/O requests that have incomplete remote requests for storage resources in a replication configuration with the failed site B. Quiescing can include pausing sending any acknowledgements to hosts or other storage clients for any in-progress writes which are in the in-progress map. Following the step S11 is a step 512.

At the step 512, a snapshot A1 of V1 is taken on site A. More generally, a snapshot A1 can be taken of all resources in a metro or synchronization configuration or partnership with the failed site B. Following the step 512, is a step S13.

At the step S13, any request or operation which was quiesced or frozen in the step S11 can now be unquiesced or unfrozen. Thus the step S13 can include resuming previously quiesced host or external client write I/O or other operations directed to the stretched volume or LUN A. The step S13 can include resuming sending acknowledgements to hosts for any in-progress writes which are in the in-progress map. From the step S13, control proceeds to the step S14.

At the step S14, site A can perform an intra-site call using the getSyncMetroInProgressRequests API to retrieve the in-progress writes recorded in the map 210. From the step S14, control proceeds to the step S15.

At the step S15, site A can perform a data-less write to the snapshot A1 of V1, where the data-less write is performed with respect to all blocks of entries of the map 210 for in-progress writes directed to the LUN A. The data-less write results in marking as modified, for the snapshot A1, the blocks of the map 210 for in-progress writes directed to the LUN A. Thus performing the data-less write on top of snapshot A1 means that snapshot A1 is associated with a list of modified blocks, where the list identifies as modified each block of an in-progress write which is directed to LUN A and which is included in the map. Thus the list of modified blocks of snapshot A1 identifies all modified or written blocks for writes that may be missing from snapshot B1 on site B until the synchronization starts. From the step S15, control proceeds to the step S16.

At the step S16, site B recovers and a new snapshot B1 of the resource V2 is taken before accepting any new I/O from site A. Snapshot A1 is guaranteed to have all the writes which Snapshot B1 has. Additionally, when site B recovers, a new snapshot A2 is taken of V1 on site A. Following the step S16 is a step S17.

At the step S17, a snap diff is computed for (A1, A2). Due to the data-less write performed in the step S15, the difference between snapshots A1 and A2 on site A includes all the writes to LUN A which occurred while site B was down (e.g., between a first point in time when site B failed to a second point in time when synchronization began when site B recovered). Thus the snapshot difference between A1 and A2 denotes all writes, including in-progress writes, which may be missing from the snapshot B1 up until the point in time when snapshot A2 is taken. The snap diff (A1, A2) can return a list of blocks marked as modified between a first point in time, when A1 was taken, and a second point in time, when A2 was taken. Thus the list of modified blocks identifies blocks of LUN A indicated as modified, where the modified blocks include: blocks of LUN A identified in the in-progress map (e.g., per the data-less write of step S15), and blocks of LUN A which have been actually written to between a first point in time when snapshot A1 was taken and a second point in time when snapshot A2 was taken. From the step S17, control proceeds to the step S18.

At the step S18, content for blocks identified on the modified block list of step S17 can be read from snapshot A2 of V2, transferred from site A to site B, and then written to corresponding blocks of snapshot B1 of site B. From the step S18, control proceeds to the step S19.

At the step S19, additional delta synchronization iterations or cycles can be performed in a manner similar to that as discussed above in connection with the first scenario, scenario 1, with the difference that the repeated snapshots of cycles are taken with respect to V1 of site A and where the delta or data difference of each cycle is applied repeatedly to snapshot B1 of V2 of site B. In the step S19, additional delta synchronization iterations or cycles can be performed until the delta or data difference of the most recent synchronization cycle is less than a threshold size. Once the last delta or difference of the most recent synchronization cycle is less than the threshold size, synchronous replication between sites A and B can be resumed while the last or most recent delta or difference is applied to snapshot B1 of V2 of site B. Subsequent to applying the last delta or data difference to snapshot of B1 of V2 of site B, site B can transition to sync passive or metro non-preferred with respect to the stretched volume LUN A.

Figure 8:
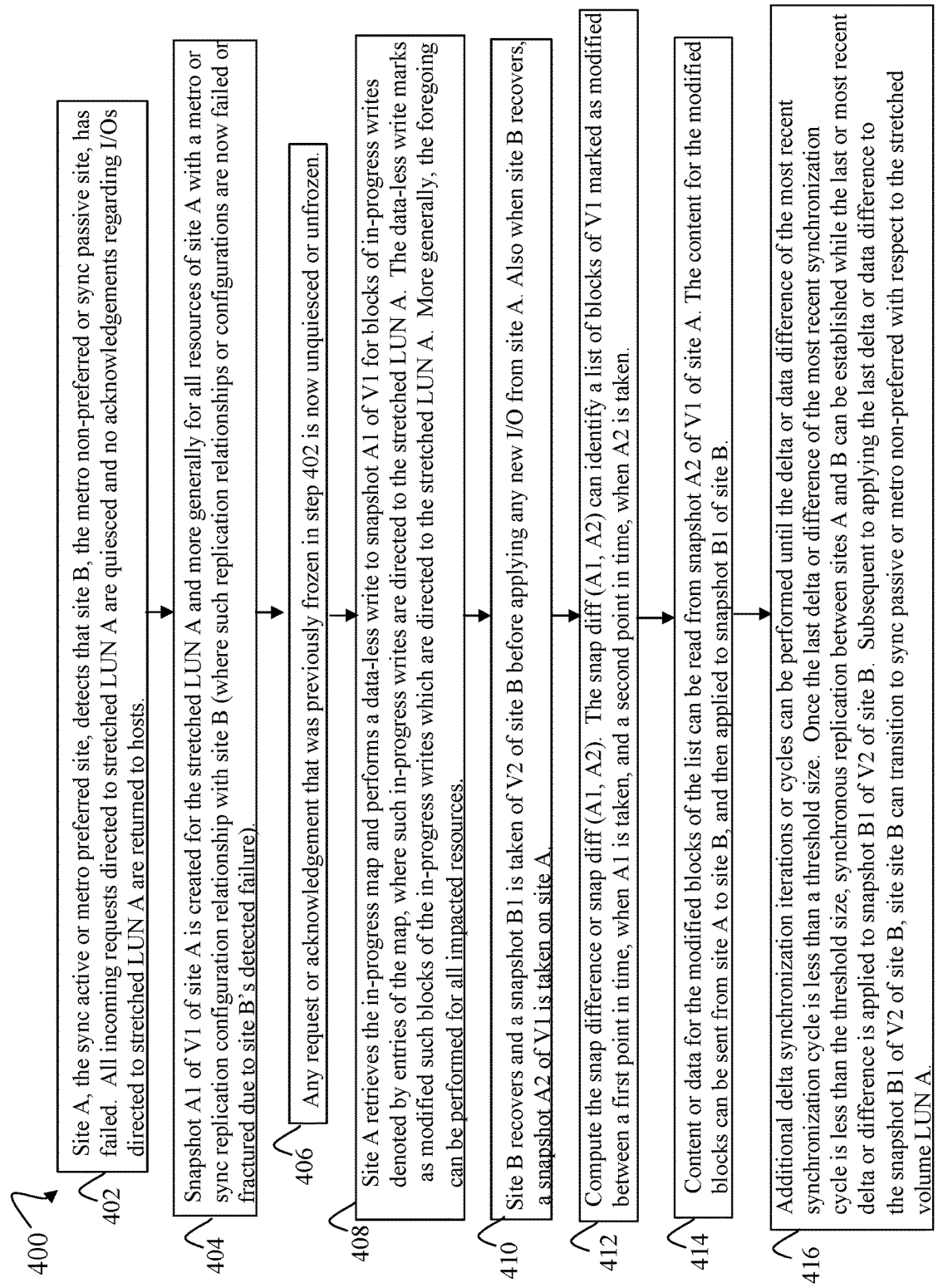

Referring to FIG. 8, shown is a flowchart 400 of processing steps that can be performed in at least one embodiment in accordance with the techniques of the present disclosure. The flowchart 400 summarizes processing discussed above for the second scenario, scenario 2.

At the step 402, site A, the sync active or metro preferred site, detects that site B, the metro non-preferred or sync passive site, has failed. All incoming requests directed to stretched LUN A are quiesced and no acknowledgements regarding I/Os directed to LUN A are returned to hosts. From the step 402, control proceeds to the step 404.

At the step 404, snapshot A1 of V1 of site A is created for the stretched LUN A and more generally for all resources of site A with a metro or sync replication configuration relationship with site B (where such replication relationships or configurations are now failed or fractured due to site B's detected failure). From the step 404, control proceeds to the step 406.

At the step 406, any request or acknowledgement that was previously frozen in step 402 is now unquiesced or unfrozen. From the step 406, control proceeds to the step 408.

At the step 408, site A retrieves the in-progress map and performs a data less write to snapshot A1 of V1 for blocks of in-progress writes denoted by entries of the map, where such in-progress writes are directed to the stretched LUN A. The data less write marks as modified such blocks of the in-progress writes which are directed to the stretched LUN A. More generally, the foregoing can be performed for all impacted resources. From the step 408, control proceeds to the step 410.

At the step 410, site B recovers and a snapshot B1 is taken of V2 of site B before applying any new I/O from site A. Also when site B recovers, a snapshot A2 of V1 is taken on site A. From the step 410, control proceeds to the step 412.

At the step 412, processing computes the snap difference or snap diff (A1, A2). The snap diff (A1, A2) can identify a list of blocks of V1 marked as modified between a first point in time, when A1 is taken, and a second point in time, when A2 is taken. From the step 412, control proceeds to the step 414.

At the step 414, content or data for the modified blocks of the list can be read from snapshot A2 of V1 of site A. The content for the modified blocks can be sent from site A to site B, and then applied to snapshot B1 of site B. From the step 414, control proceeds to the step 416.

At the step 416, additional delta synchronization iterations or cycles can be performed until the delta or data difference of the most recent synchronization cycle is less than a threshold size. Once the last delta or difference of the most recent synchronization cycle is less than the threshold size, synchronous replication between sites A and B can be established while the last or most recent delta or difference is applied to snapshot B1 of V2 of site B. Subsequent to applying the last delta or data difference to the snapshot B1 of V2 of site B, site B can transition to sync passive or metro non-preferred with respect to the stretched volume LUN A.

What will now be described is a third scenario, scenario 3, where site A, the metro preferred or sync active site, fails or becomes unavailable. Subsequently, site A recovers. However, the remaining metro non-preferred or sync passive site B was not promoted in response to site A's failure. As a result, there was a data unavailability of the stretched LUN A due to the disruption in service to access the stretched LUN A as well as other impacted resources. When site A recovers and is back online after recovering from its failure, and before site A resources resynchronize with site B, processing described below can be performed.

In a step S21, when site A recovers but before site A commences servicing I/Os or requests, a snapshot A1 can be taken of V1, and more generally of all impacted resources of the metro or sync replication configuration or relationship with site B. Subsequent to site A taking the snapshot A1, site A can commence servicing I/Os, including writes, directed to the stretched LUN A (and where such writes can then be applied to V1 of site A). At this point, site A can service I/Os directed to the stretched LUN A but the replication configuration with site B is fractured or failed and has not yet been re-established. Also site B does not otherwise service I/Os or requests directed to the stretched LUN A. From the step S21, control proceeds to the step S22.

At the step S22, site A can issue an API call using getSyncMetroInProgressRequests to obtain the in-progress map. From the step S22, control proceeds to the step S23.

At the step S23, site A performs a data-less write to V1 for blocks of the in-progress writes denoted by entries of the map, where such in-progress writes are directed to the stretched LUN A. The data-less write marks as modified such blocks of the in-progress writes which are directed to LUN A. The data-less write of the step S23 ensures that the in-progress writes will be re-transferred to site B in a subsequent step as a result of a snap difference also performed in a subsequent step. From the step S23, control proceeds to the step S24.

At the step S24, a snapshot B1 of the resource V2 on Site B is taken before the resynchronization starts. The only missing writes in snapshot B1 as compared to snapshot A1 are the in-progress writes, such as those in-progress writes of the map directed to the stretched LUN A. From the step S24, control proceeds to the step S25.

At the step S25, a snapshot A2 is taken of V1 on site A.

From the step S25, control proceeds to the step S26 where a snapshot difference or snap diff (A1, A2) is performed. Due to the data-less writes done in step S23, the difference between snapshot A2 and snapshot A1 on site A has all the writes that are missing on Site B with snapshot B1 until the synchronization starts (in step S26). The snap diff (A1, A2) identifies a list of blocks of V1 marked as modified between a first point in time, when A1 is taken, and a second point in time, when A2 is taken.

From the step S26, control proceeds to the step S27 where the content or data for the modified blocks of the list of the snap diff (A1, A2) (of step S25) can be read from snapshot A2 of V1 of site A. The content for the modified blocks of the list can be sent from site A to site B and then applied to the snapshot B1 of V2 on site B. At this point, there are two sources of modified blocks to the stretched LUN A: from the in-progress map and from write I/Os or requests directed to LUN A which are received and serviced by site A between the time when snapshots A1 and A2 are taken. At this point, content for all such blocks are included in snap diff (A1, A2) and such content has also been transferred and applied to snapshot B1 of V2 of site B.

From the step S27, control proceeds to the step S28 where additional delta synchronization iterations or cycles can be performed in a manner consistent with discussion elsewhere herein.

Figure 9:
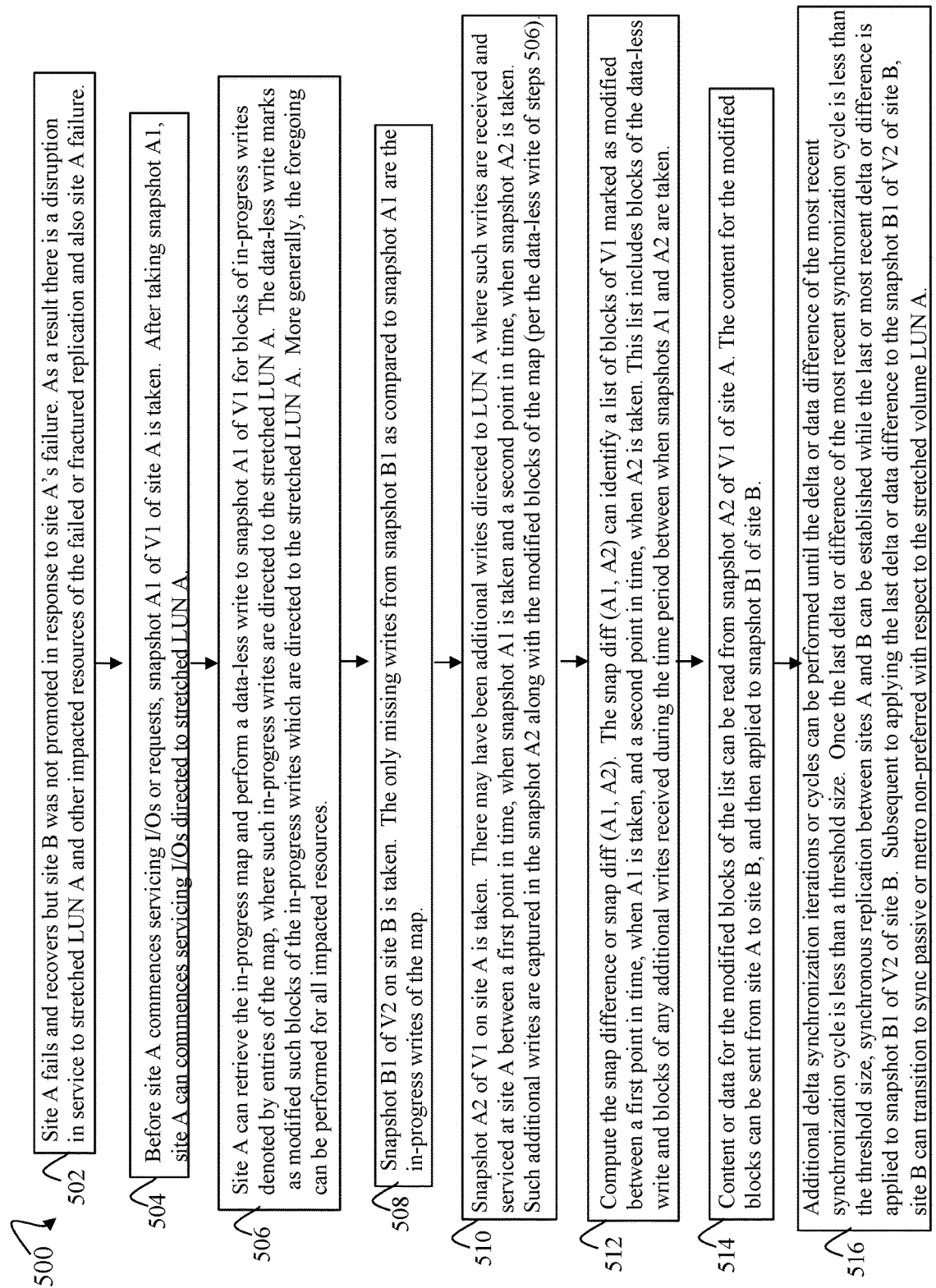

Referring to FIG. 9, shown is a flowchart 500 of processing steps that can be performed in at least one embodiment in accordance with the techniques of the present disclosure. The flowchart 500 summarizes processing discussed above for the third scenario, scenario 3, discussed above.

At the step 502, site A fails and recovers but site B was not promoted in response to site A's failure. As a result there is a data unavailability or disruption in service to stretched LUN A and other impacted resources of the failed or fractured replication and also site A failure. From the step 502, control proceeds to the step 504.

At the step 504, after site A recovers and before recovered site A commences servicing I/Os or requests, snapshot A1 of V1 of site A is taken. When site A recovers, site A resumes its role as metro preferred or sync active. After taking snapshot A1, site A can commences servicing I/Os directed to stretched LUN A. From the step 504, control proceeds to the step 506.

At the step 506, site A can retrieve the in-progress map and perform a data-less write to snapshot A1 of V1 for blocks of in-progress writes denoted by entries of the map, where such in-progress writes are directed to the stretched LUN A. The data-less write marks as modified such blocks of the in-progress writes which are directed to the stretched LUN A. More generally, the foregoing can be performed for all impacted resources. From the step 506, control proceeds to the step 508.

At the step 508, snapshot B1 of V2 on site B is taken. The only missing writes from snapshot B1 as compared to snapshot A1 are the in-progress writes of the map. From the step 508, control proceeds to the step 510.

At the step 510, snapshot A2 of V1 on site A is taken. There may have been additional writes directed to LUN A where such writes are received and serviced at site A between a first point in time, when snapshot A1 is taken and a second point in time, when snapshot A2 is taken. Such additional writes are captured in the snapshot A2 along with the modified blocks of the map (per the data-less write of steps 506). From the step 510, control proceeds to the step 512.

At the step 512, processing on site A can be performed to compute the snap difference or snap diff (A1, A2). The snap diff (A1, A2) can identify a list of blocks of V1 marked as modified between a first point in time, when A1 is taken, and a second point in time, when A2 is taken. This list includes blocks of the data-less write and blocks of any additional writes received during the time period between when snapshots A1 and A2 are taken. From the step 512, control proceeds to the step S14.

At the step S14, content or data for the modified blocks of the list can be read from snapshot A2 of V1 of site A. The content for the modified blocks can be sent from site A to site B, and then applied to snapshot B1 of site B. From the step S14, control proceeds to the step S16.

At the step S16, additional delta synchronization iterations or cycles can be performed until the delta or data difference of the most recent synchronization cycle is less than a threshold size. Once the last delta or difference of the most recent synchronization cycle is less than the threshold size, synchronous replication between sites A and B can be established while the last or most recent delta or difference (between consecutive snapshots of V1 of site A) is applied to snapshot B1 of V2 of site B. Subsequent to applying the last delta or data difference to the snapshot B1 of V2 of site B, site B can transition to sync passive or metro non-preferred with respect to the stretched volume LUN A.

What will now be described is a fourth scenario, scenario 4, where a network or replication link between site A, the metro preferred or sync active site, and site B, the metro non-preferred or sync passive site, fails resulting in replication failure or fracture between sites A and B. In at least one embodiment, responsive to the replication link failure, site A can continue to service I/Os and site B can be unavailable or otherwise not service I/Os in connection with stretched LUN A and other resources in a replication configuration between sites A and B. Once the replication link recovers from its failure and is able to be used for replicating data between sites A and B, processing can be performed to re-establish the fractured or failed replication between sites A and B such as with respect to stretched LUN A. In order to accomplish this, workflow processing as described in connection with scenario 2 (e.g., FIG. 8) can be performed with the difference that site B has not failed and is therefore not recovering, and site B is not the cause of the replication failure or fracture between sites A and B. Rather the cause of the replication failure or fracture is the replication link failure. However, recovery of the failed replication link from scenario 4 provides a similar result or effect with respect to site B of scenario 2 in that processing can now be performed to synchronize sites A and site B using the recovered replication link and then subsequently re-establish the replication between sites A and B. In connection with FIG. 8 processing described above for scenario 2 where site B fails, the processing of FIG. 8 can similarly be performed in connection with scenario 4 with the difference being that the triggering event of replication failure or fracture is the failed replication link of scenario 4 rather than the site B failure of scenario 2. In particular with reference to FIG. 8, the step 402 can be performed with the difference that site A detects the failed replication link. The step 410 can be performed with the difference that rather than site B recovering, the event can be that the failed replication link has recovered and can be used for replication between sites A and B. Responsive to the recovered replication link, the step 410 can be performed where snapshot B1 of V2 of site is taken and where snapshot A2 of V1 of site A is taken.

In at least one embodiment, the in-progress map can be stored in mirrored cache memory. If there should be a loss of the in-progress map such as due to failure of the mirrored cache memory, or more generally, failure of the persistent storage used for the in-progress map, resynchronizing the state, content and data on sites A and B, such as for the stretched LUN A configured from V1 of site A and V2 of site B, can rely on existing identical snapshots as a common base or resynchronization starting point and resynchronize based on such identical snapshots. In some cases, the existing identical snapshots can be user created snapshots. If the two sites A and B do not have such identical snapshots, some selected version of the impacted resource can be selected from a first of the sites A and B, and the selected version of the first site can be used and copied to the second site.

The techniques of the present disclosure utilize the in-progress remote write requests to track writes that may have been in progress at the time of a replication fracture or failure due to any of the different types of failures and scenarios discussed herein. In comparison to conventional techniques such as the use of continuous periodic recovery snapshots, the techniques of the present disclosure reduce the amount of data transferred to synchronize the two sites A and B of the fracture or failed replication configuration for a stretched resource, such as the stretched LUN A discussed above. Thus in comparison to conventional techniques such as the use of continuous periodic recovery snapshots, the techniques of the present disclosure also reduce the amount of time needed to synchronize the two sites A and B of the fracture or failed replication configuration for a stretched resource, such as the stretched LUN A discussed above.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   establishing a synchronous replication configuration for a first stretched resource that has a first identity, wherein the first stretched resource is configured from a first resource on a first storage system and a second resource on a second storage system, wherein the first resource and the second resource are both configured to have a same identity, the first identity, wherein the first resource is exposed to a host over a first path between the first storage system and the host, wherein the second resource is exposed to the host over a second path between the second storage system and the host, wherein the host identifies the first path and the second path as two paths to a same stretched resource, the first stretched resource;
   tracking, by the first storage system, a plurality of in-progress write requests in a map, wherein the map includes a corresponding entry for each of the plurality of in-progress write requests which has been committed by the first storage system and where the first storage system has not yet received an acknowledgement from the second storage system regarding commitment of said each in-progress write request;
   determining a failure of the first storage system thereby failing or fracturing the established synchronous replication configuration for the first stretched resource;
   responsive to said determining the failure of the first storage system, performing first processing including taking a snapshot B1 of the second resource of the second storage system;
   and responsive to the first storage system recovering from the failure, performing second processing including:
   taking a snapshot A1 of the first resource of the first storage system;
   the second storage system retrieving the map from the first storage system;
   for each in-progress write request of the map directed to the first stretched resource, the second storage system marking blocks specified by said each in-progress write request as modified on the second resource;
   taking a snapshot B2 of the second resource of the second storage system;
   computing a first snapshot difference between the snapshot B1 and the snapshot B2, wherein the first snapshot difference identifies a first list of blocks of the second resource marked as modified; and
   storing content of modified blocks of the first list at corresponding blocks of the snapshot A1 of the first resource of the first storage system.

2. The computer-implemented method of claim 1, further comprising:
   the first storage system tracking in-progress write requests for first write requests that are directed to the first stretched resource and received at the first storage system; and
   the first storage system tracking second write requests that are directed to the first stretched resource and received at the second storage system.

3. The computer-implemented method of claim 2, wherein servicing each of the second write requests received by the second storage system includes:
   forwarding said each second write request to the first storage system;
   the first storage system committing said each second write request;
   the first storage system creating an entry in the map identifying said each second write request as an in-progress write request;
   for said each second write request, sending a corresponding remote write request from the first storage system to the second storage system requesting that the second storage system commit said each second write request;
   the second storage system receiving the corresponding remote write request and committing said each second write request;
   the second storage system returning an acknowledgement to the first storage system regarding commitment of the said each second write request by the second storage system;
   in response to the first storage system receiving the acknowledgement, the first storage system deleting a corresponding entry from the map for said each second write request, and the first storage system sending a second acknowledgement to the second storage system regarding completion of said each second write request; and
   in response to the second storage system receiving the second acknowledgement, the second storage system returning a third acknowledgement to the host which sent said each second write request to the second storage system.

4. The computer-implemented method of claim 1, wherein the first processing is performed 68 while the first storage system is offline, down or unavailable prior to the first storage system recovering from the failure, and wherein said first processing includes:
   the second storage system receiving and servicing a second plurality of write requests that are received from the host and that are directed to the stretched resource, wherein said servicing the second plurality of write requests includes the second storage system applying the second plurality of write requests to the second resource of the second storage system.

5. The computer-implemented method of claim 1, further comprising:
   for each in-progress write request of the map directed to the first stretched resource, the second storage system issuing a data-less write request to mark blocks of said each in-progress write request as modified on the second resource without writing any content to the second resource of the second storage system.

6. The computer-implemented method of claim 1, wherein each entry of the map includes a data structure comprising one or more fields identifying a target location on the second resource, wherein the target location includes one or more blocks.

7. The computer-implemented method of claim 6, wherein the data structure identifies the target location using a plurality of fields including a first field identifying a storage resource identifier denoting the second resource, a starting offset on the second resource, and a length denoting a size of the target location.

8. The computer-implemented method of claim 1, wherein the first storage resource and the second resource are both a first resource type, and wherein the first resource type is one of a plurality of resource types, wherein the plurality of resource types include:
a volume, a logical device, a logical unit (LUN), a virtual volume (vvol), and a file system.

9. One or more non-transitory computer-readable media comprising code stored thereon that, when executed, performs a method comprising:
establishing a synchronous replication configuration for a first stretched resource that has a first identity, wherein the first stretched resource is configured from a first resource on a first storage system and a second resource on a second storage system, wherein the first resource and the second resource are both configured to have a same identity, the first identity, wherein the first resource is exposed to a host over a first path between the first storage system and the host, wherein the second resource is exposed to the host over a second path between the second storage system and the host, wherein the host identifies the first path and the second path as two paths to a same stretched resource, the first stretched resource;
tracking, by the first storage system, a plurality of in-progress write requests in a map, wherein the map includes a corresponding entry for each of the plurality of in-progress write requests which has been committed by the first storage system and where the first storage system has not yet received an acknowledgement from the second storage system regarding commitment of said each in-progress write request;
determining a failure of the second storage system thereby failing or fracturing the established synchronous replication configuration for the first stretched resource;
responsive to said determining the failure of the second storage system, performing first processing including:
the first storage system quiescing I/O activity directed to the stretched resource;
taking a snapshot A1 of the first resource of the first storage system;
the first storage system unquiescing I/O activity directed to the stretched resource; and
for each in-progress write request of the map directed to the first stretched resource, the first storage system marking blocks specified by said each in-progress write request as modified on the snapshot A1 of first resource; and
responsive to determining that the second storage system has recovered from the failure, performing second processing including:
taking a snapshot B1 of the second resource of the second storage system;
taking a snapshot A2 of the first resource of the first storage system;
computing a first snapshot difference between the snapshot A1 and the snapshot A2, wherein the first snapshot difference identifies a first list of blocks of the first resource marked as modified; and
storing content of modified blocks of the first list at corresponding blocks of the snapshot B1 of the second resource of the first storage system.

10. The one or more non-transitory computer-readable media of claim 9, wherein said quiescing I/O activity includes pausing incoming requests directed to the stretched resource and freezing acknowledgements from the first storage system to the host regarding I/Os directed to the stretched resource.

11. The one or more non-transitory computer-readable media of claim 9, wherein said quiescing I/O activity includes freezing acknowledgements from the first storage system to the host regarding pending I/O requests that have corresponding in-progress write requests in the map.

12. The one or more non-transitory computer-readable media of claim 9, wherein the method further includes:
for each in-progress write request of the map directed to the first stretched resource, the first storage system issuing a data-less write request to mark blocks of said each in-progress write request as modified on the snapshot A1 of the first resource without writing any content to the second resource of the second storage system.

13. The one or more non-transitory computer-readable media of claim 9, wherein said unquiescing I/O activity includes resuming processing of incoming requests directed to the stretched resource and resuming sending acknowledgements from the first storage system to the host regarding I/Os directed to the stretched resource.

14. The one or more non-transitory computer-readable media of claim 9, wherein said unquiescing I/O activity includes resuming sending acknowledgements from the first storage system to the host regarding pending I/O requests that have corresponding in-progress write requests in the map.

15. The one or more non-transitory computer-readable media of claim 9, wherein the first storage resource and the second resource are both a first resource type, and wherein the first resource type is one of a plurality of resource types, wherein the plurality of resource types include:
a volume, a logical device, a logical unit (LUN), a virtual volume (vvol), and a file system.

16. The one or more non-transitory computer-readable media of claim 9, wherein the first processing includes:
the first storage system receiving, from the host, a first plurality of write requests directed to the stretched resource; and
the first storage system servicing the first plurality of write requests using the first resource of the first storage system.

17. The one or more non-transitory computer-readable media of claim 9, wherein the synchronous replication configuration is a two-way or bidirectional synchronous replication configuration where writes directed to the stretched resource are received at the first storage system, applied to the first resource, and synchronously replicated from the first storage system to the second storage system; and where writes directed to the stretched resource are received at the second storage system, forwarded to the first storage system, applied to the first resource, and synchronously replicated from the first storage system to the second storage system.

18. A system comprising:
one or more processors; and
a memory comprising code stored thereon that, when executed, performs a method comprising:
establishing a synchronous replication configuration for a first stretched resource that has a first identity, wherein the first stretched resource is configured from a first resource on a first storage system and a second resource on a second storage system, wherein the first resource and the second resource are both configured to have a same identity, the first identity, wherein the first resource is exposed to a host over a first path between the first storage system and the host, wherein the second resource is exposed to the host over a second path between the second storage system and the host, wherein the host identifies the first path and the second path as two paths to a same stretched resource, the first stretched resource;
tracking, by the first storage system, a plurality of in-progress write requests in a map, wherein the map includes a corresponding entry for each of the plurality of in-progress write requests which has been committed by the first storage system and where the first storage system has not yet received an acknowledgement from the second storage system regarding commitment of said each in-progress write request;
determining a failure of the first storage system thereby failing or fracturing the established synchronous replication configuration for the first stretched resource, wherein the second storage system does not service requests directed to the first stretched resource responsive said failure of the first storage system thereby causing a disruption in service and data unavailability of the first stretched resource; and
responsive to the first storage system recovering from the failure, performing first processing including:
taking a snapshot A1 of the first resource of the first storage system;
for each in-progress write request of the map directed to the first stretched resource, the first storage system marking blocks specified by said each in-progress write request as modified on the snapshot A1 of first resource;
taking a snapshot B1 of the second resource of the second storage system;
after taking the snapshot B1, the first storage system receiving a first plurality of writes directed to the stretched resource and applying the first plurality of writes to the first resource;
after applying the first plurality of writes to the first resource, taking a snapshot A2 of the first resource of the first storage system;
computing a first snapshot difference between the snapshot A1 and the snapshot A2, wherein the first snapshot difference identifies a first list of blocks of the first resource marked as modified; and
storing content of modified blocks of the first list at corresponding blocks of the snapshot B1 of the second resource of the first storage system.

19. The system of claim 18, wherein the method further includes:
for each in-progress write request of the map directed to the first stretched resource, the first storage system issuing a data-less write request to mark blocks of said each in-progress write request as modified on the snapshot A1 of the first resource without writing any content to the second resource of the second storage system.

20. The system of claim 18, wherein the first storage resource and the second resource are both a first resource type, and wherein the first resource type is one of a plurality of resource types, wherein the plurality of resource types include:
a volume, a logical device, a logical unit (LUN), a virtual volume (vvol), and a file system.

* * * * *

UNITED STATES PATENT AND TRADEMARK OFFICE
CERTIFICATE OF CORRECTION

| | | |
|---|---|---|
| PATENT NO. | : 12,105,982 B1 | Page 1 of 1 |
| APPLICATION NO. | : 18/122978 | |
| DATED | : October 1, 2024 | |
| INVENTOR(S) | : Subramanian et al. | |

It is certified that error appears in the above-identified patent and that said Letters Patent is hereby corrected as shown below:

In the Claims

Column 44, Line 53:
In Claim 4, the phrase "is performed 68 while the first" should read -- is performed while the first --

Signed and Sealed this
Tenth Day of December, 2024

Katherine Kelly Vidal
*Director of the United States Patent and Trademark Office*